US012062835B2

(12) United States Patent
Irci et al.

(10) Patent No.: US 12,062,835 B2
(45) Date of Patent: Aug. 13, 2024

(54) WIRELESS DEVICES HAVING CO-EXISTING ANTENNA STRUCTURES

(71) Applicant: Apple Inc., Cupertino, CA (US)

(72) Inventors: Erdinc Irci, Sunnyvale, CA (US); Aaron H. Squier, San Francisco, CA (US); Daisong Zhang, Cupertino, CA (US); Enrique Ayala Vazquez, Watsonville, CA (US); Hongfei Hu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 499 days.

(21) Appl. No.: 17/222,557

(22) Filed: Apr. 5, 2021

(65) Prior Publication Data

US 2022/0085488 A1 Mar. 17, 2022

Related U.S. Application Data

(60) Provisional application No. 63/077,419, filed on Sep. 11, 2020.

(51) Int. Cl.

| | |
|---|---|
| ***H01Q 1/12*** | (2006.01) |
| ***H01Q 1/24*** | (2006.01) |
| ***H01Q 5/35*** | (2015.01) |
| ***H01Q 13/10*** | (2006.01) |

(52) U.S. Cl.

CPC ............... *H01Q 1/243* (2013.01); *H01Q 5/35* (2015.01); *H01Q 13/10* (2013.01)

(58) Field of Classification Search

CPC .......... H01Q 1/243; H01Q 5/35; H01Q 13/10; H01Q 1/2291; H01Q 1/44; H01Q 5/328; H01Q 5/335; H01Q 5/342; H01Q 9/42; H01Q 21/28; H01Q 1/24; H01Q 1/12; H01Q 1/38

See application file for complete search history.

(56) References Cited

U.S. PATENT DOCUMENTS

| | | | | |
|---|---|---|---|---|
| 10,177,440 | B2 | 1/2019 | Jung et al. | |
| 10,193,597 | B1 * | 1/2019 | Garrido Lopez ........ | H04B 1/38 |
| 10,256,527 | B2 | 4/2019 | Kim et al. | |
| 10,476,167 | B2 | 11/2019 | Ayala Vazquez et al. | |
| 10,530,042 | B2 | 1/2020 | Avser et al. | |
| 10,644,758 | B2 | 5/2020 | Irci et al. | |
| 10,651,555 | B2 | 5/2020 | Paulotto et al. | |
| 10,665,925 | B2 | 5/2020 | Liu et al. | |
| 10,862,216 | B1 * | 12/2020 | Ayala Vazquez ...... | H01Q 21/28 |
| 11,171,406 | B2 * | 11/2021 | Yun ........................ | H01Q 9/045 |

(Continued)

*Primary Examiner* — Hai V Tran
*Assistant Examiner* — Bamidele A Immanuel
(74) *Attorney, Agent, or Firm* — Treyz Law Group, P.C.; Michael H. Lyons; Tianyi He

(57) ABSTRACT

An electronic device may be provided with first, second, and third antennas and a dock flex. A first feed terminal for the first antenna may be coupled to a second feed terminal for the second antenna over a first path. The first path may be coupled to ground over a second path. Tuning components may be interposed on the first and second paths. The third antenna may be patterned on a first portion of the dock flex. Front end components for the first antenna may be mounted to a second portion of the dock flex. The first and second portions may extend from a tail of the dock flex. The tail may be wrapped around a plastic support block to hold the second portion over the first portion. The plastic support block may have a snap hook clip that holds the second portion in place.

20 Claims, 15 Drawing Sheets

(56) References Cited

U.S. PATENT DOCUMENTS 11,228,345 B1* 1/2022 Wang ........................ H04B 1/40
2006/0145931 A1* 7/2006 Ranta ........................ H01Q 1/38 343/702
2011/0241949 A1* 10/2011 Nickel ..................... H01Q 1/48 343/702
2012/0009983 A1* 1/2012 Mow ........................ H04B 1/40 343/745
2012/0112969 A1* 5/2012 Caballero .............. H01Q 1/243 343/702
2012/0229347 A1* 9/2012 Jin ......................... H01Q 21/28 343/702
2013/0050046 A1* 2/2013 Jarvis ..................... H01Q 9/145 343/852
2013/0154897 A1* 6/2013 Sorensen ................. H04B 1/40 343/861
2013/0169490 A1* 7/2013 Pascolini ............... H01Q 5/357 343/702
2013/0194139 A1* 8/2013 Nickel ................... H01Q 1/243 343/745
2013/0201067 A1* 8/2013 Hu ....................... H01Q 9/0421 343/745
2013/0203364 A1* 8/2013 Darnell .................. H01Q 1/243 455/90.3
2013/0257659 A1* 10/2013 Darnell .................. H05K 1/028 343/702
2014/0078008 A1* 3/2014 Kang ........................ H01Q 5/35 343/702
2017/0358847 A1* 12/2017 Cho ......................... H05K 1/18
2019/0081398 A1* 3/2019 Zhou ........................ H01Q 9/42
2019/0081694 A1* 3/2019 Zhou ...................... H05K 1/028
2019/0260112 A1* 8/2019 Azad ........................ H01Q 9/42
2019/0260126 A1* 8/2019 Ayala ................... H01Q 9/0485
2019/0327834 A1* 10/2019 Kim ....................... H01Q 1/245
2019/0393586 A1* 12/2019 Ayala Vazquez ...... H01Q 5/328
2021/0075090 A1* 3/2021 Yarga ..................... H01Q 1/241
2022/0102852 A1* 3/2022 Irci ....................... H04M 1/026

* cited by examiner

86

| BAND (88) | FREQUENCIES (MHz) (90) | ANTENNA COVERAGE (92) 40-1 | 40-2 | 40-3 | 40-4 | 40-5 | 40-6 | 40-7 | 40-8 | 40-9 |
|---|---|---|---|---|---|---|---|---|---|---|
| LB | 600-960 | YES | YES | NO | NO | NO | NO | NO | NO | NO |
| L5 GPS | 1176 | NO | NO | YES | NO | NO | NO | NO | NO | NO |
| LMB | 1400-1550 | YES | YES | NO | NO | NO | NO | NO | NO | NO |
| L1 GPS | 1575 | NO | YES | NO | NO | NO | NO | NO | NO | NO |
| MB | 1700-2200 | YES | YES | YES | YES | NO | NO | NO | NO | NO |
| HB | 2300-2700 | YES | YES | YES | YES | NO | NO | NO | NO | NO |
| WLAN/WPAN 2.4GHz | 2400-2480 | NO | NO | YES | YES | NO | NO | NO | NO | NO |
| UHB | 3300-5000 | NO | NO | NO | YES | NO | NO/YES | YES | YES | YES |
| WLAN 5GHz | 5180-5825 | NO | NO | NO | NO | YES | YES | NO | NO | NO |
| UWB | 6250-8250 | NO | NO | NO | NO | NO | NO/YES | NO | YES/NO | NO |

*FIG. 7*

WIRELESS DEVICES HAVING CO-EXISTING ANTENNA STRUCTURES

This application claims the benefit of provisional patent application No. 63/077,419, filed Sep. 11, 2020, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

It would therefore be desirable to be able to provide improved wireless communications circuitry for wireless electronic devices.

SUMMARY

An electronic device may be provided with wireless circuitry and a housing having peripheral conductive housing structures and a conductive support plate. The peripheral conductive housing structures may include first and second segments at a lower end of the device. The first and second segments may be separated from the conductive support plate by a slot. The first segment may form a first antenna resonating element arm for a first antenna. The second segment may form part of an open slot antenna resonating element for a second antenna.

The first antenna may be fed using a first positive antenna feed terminal on the first segment and a first radio-frequency transmission line coupled to the first positive antenna feed terminal. The second antenna may be fed using a second positive antenna feed terminal on the second segment and a second radio-frequency transmission line coupled to the second positive antenna feed terminal. A first conductive path may couple the first positive antenna feed terminal to the second positive antenna feed terminal. A second conductive path may couple a node on the first conductive path to the conductive support plate. A return path for the first antenna may couple the first segment to the conductive support plate. A first antenna tuning component for the first antenna may be interposed on the first conductive path. A second antenna tuning component for the first antenna may be interposed on the second conductive path. A third antenna tuning component for the first antenna may be interposed on the return path.

A flexible printed circuit may be mounted to the conductive support plate and the peripheral conductive housing structures. The flexible printed circuit may have a dock portion. A dock may be mounted to the dock portion. The flexible printed circuit may have first and second tails extending from a first side of the dock portion. The flexible printed circuit may have a third tail extending from a second side of the dock portion. The flexible printed circuit may have a first portion at an end of the third tail and a second portion extending from a side of the third tail. A third antenna may be formed on the second portion and may be fed using a third radio-frequency transmission line. The first radio-frequency transmission line may be coupled to the first positive antenna feed terminal through the first portion, the third tail, and the dock portion. The second radio-frequency transmission line may be coupled to the second positive antenna feed terminal through part of the third tail and the dock portion.

A plastic support block may be mounted to the third tail. The third tail may have a folded portion. The folded portion of the third tail and the first portion of the flexible printed circuit may be wrapped around the plastic support block. The plastic support block may have a snap hook clip that holds the first portion of the flexible printed circuit in place over the second portion of the flexible printed circuit. A bridging clip may couple the first portion to a feed clip for the second antenna.

BRIEF DESCRIPTION OF THE DRAWINGS

FIG. 7 is a chart of illustrative frequency bands that may be covered by antennas in an electronic device in accordance with some embodiments.

DETAILED DESCRIPTION

Figure 1:
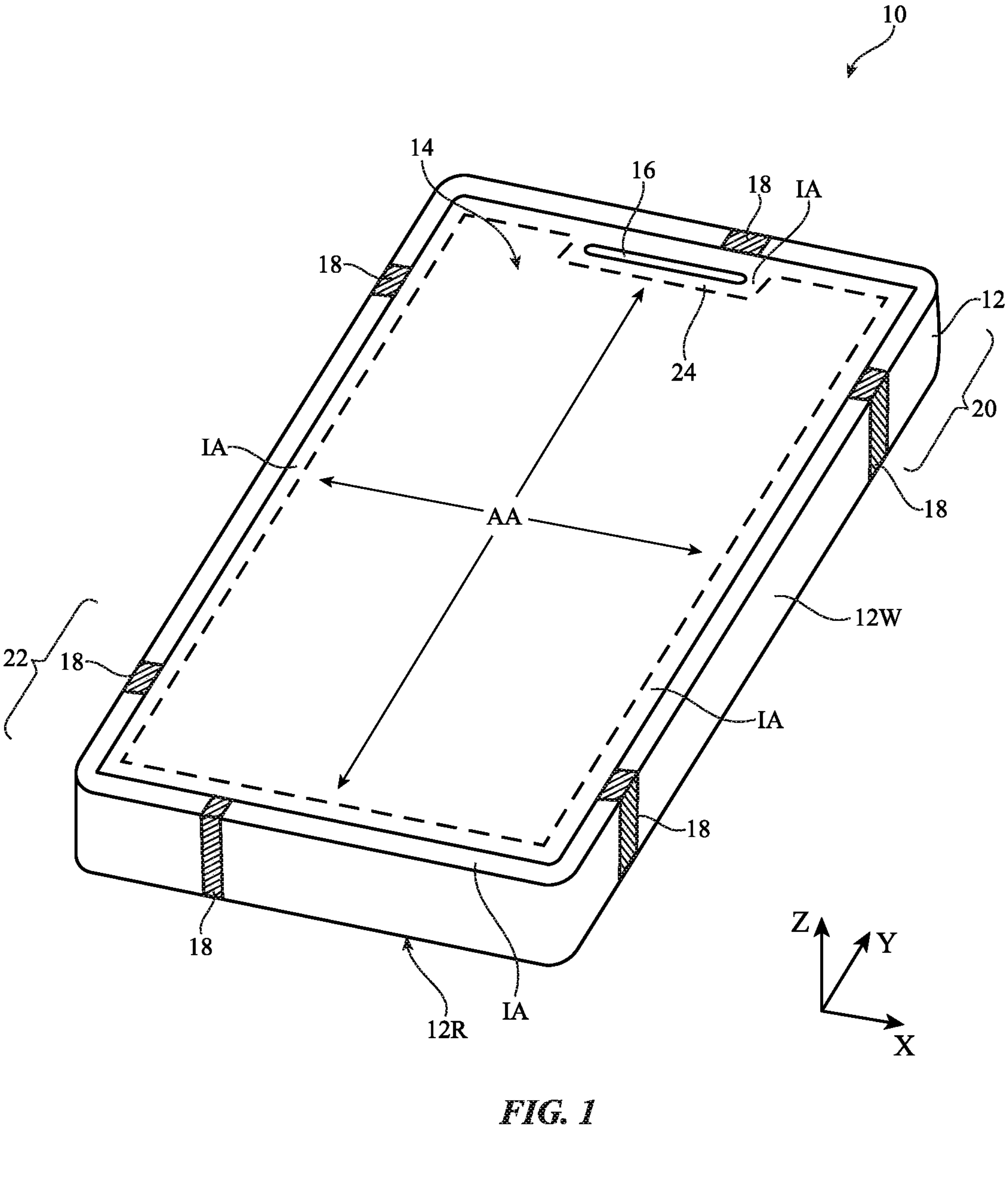
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
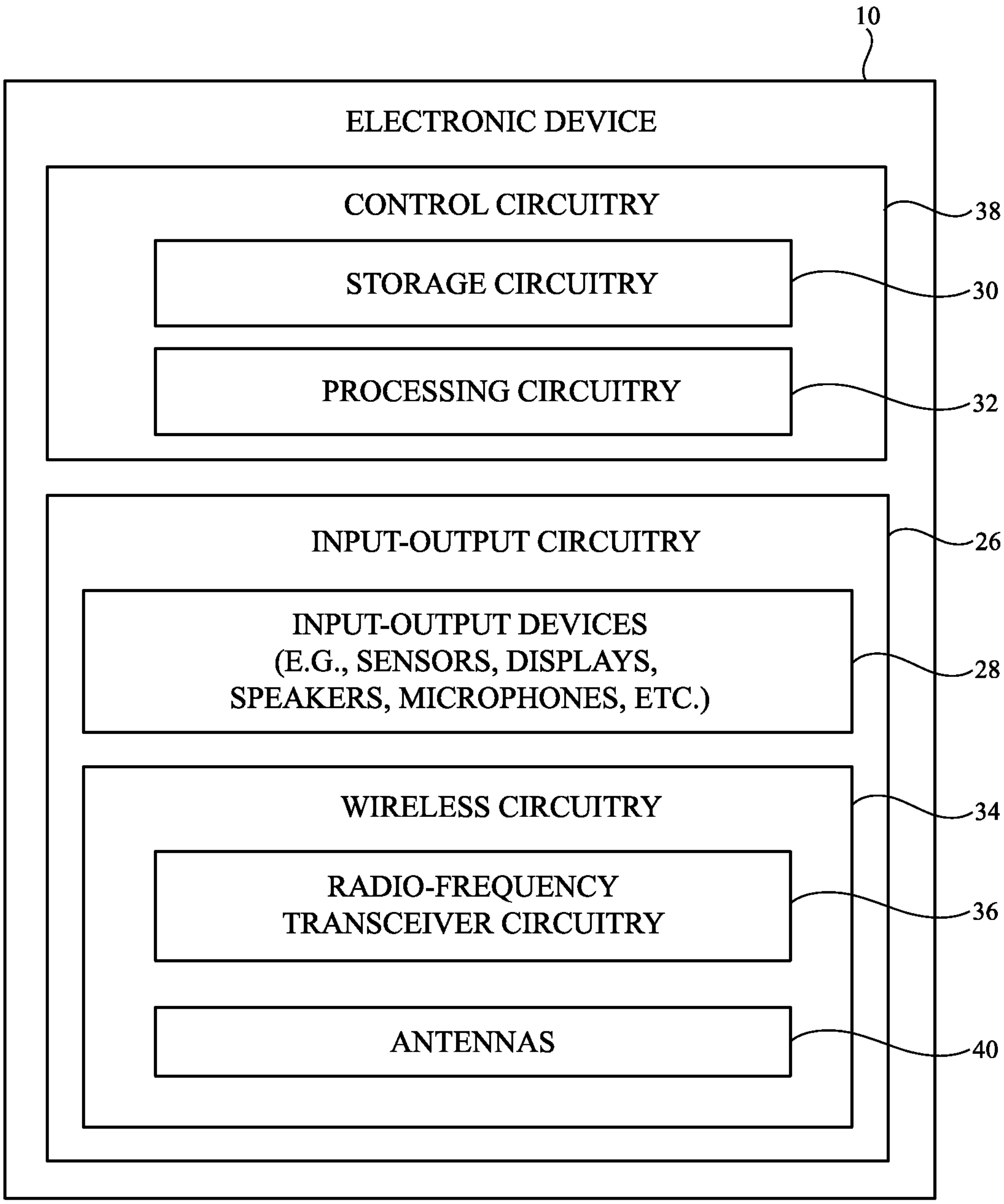
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals in various radio-frequency communications bands. For example, radio-frequency transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, 5G New Radio Frequency Range 2 (FR2) bands at millimeter and centimeter wavelengths between 20 and 60 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), an ultra-wideband (UWB) communications band supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by radio-frequency transceiver circuitry 36 may sometimes be referred to herein as frequency bands or simply as "bands," and may span corresponding ranges of frequencies.

In one suitable arrangement that is described herein as an example, the UHB band handled by radio-frequency transceiver circuitry 36 may include 4G bands between 3300 and 5000 MHz such as Long Term Evolution (LTE) bands B42 (e.g., 3400 MHz-3600 MHz), B46 (e.g., 5150-5925 MHz), and/or B48 (e.g., 3500-3700 MHz), as well as 5G bands below 6 GHz (e.g., 5G NR FR1 bands) such as 5G bands N77 (e.g., 3300-4200 MHz), N78 (e.g., 3300-3800 MHz), and/or N79 (e.g., 4400-5000 MHz). The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands.

Figure 3:
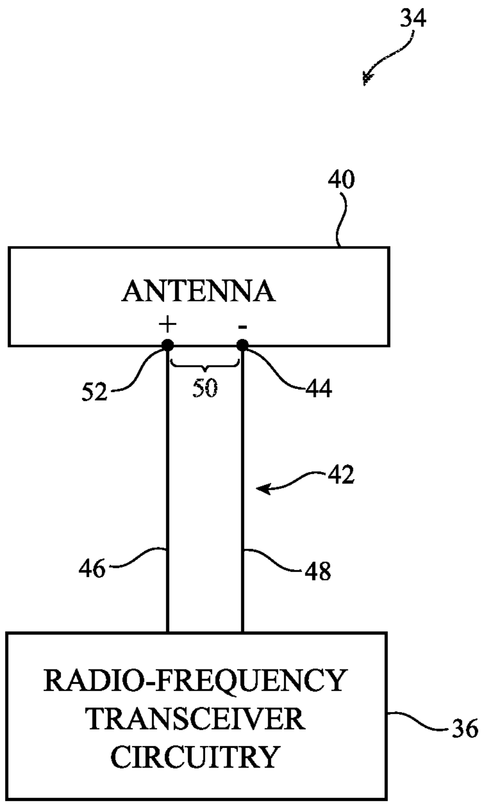
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
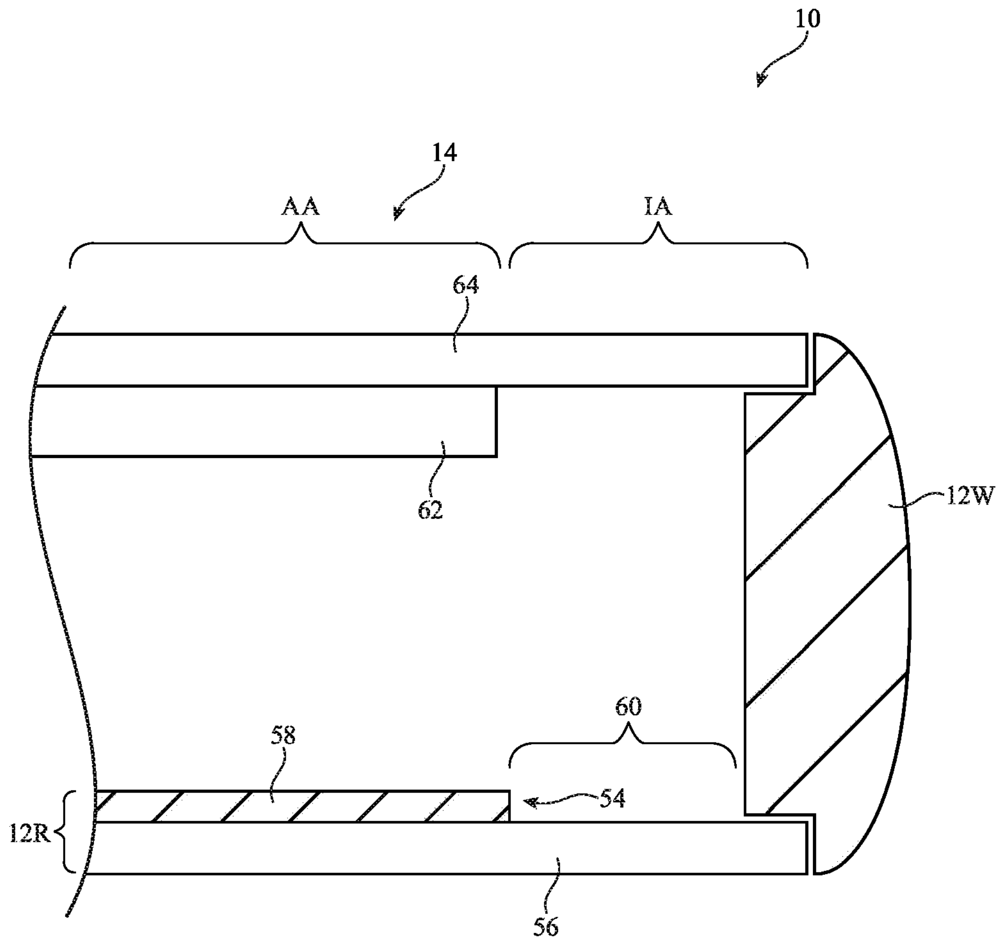
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive support plate 58 may, if desired, provide structural and mechanical support for device 10.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

Conductive housing structures such as conductive support plate 58 and/or peripheral conductive housing structures 12W (e.g., the portion of peripheral conductive housing structures 12W opposite conductive support plate 58 at slot 60) may be used to form antenna structures for one or more of the antennas 40 in device 10. For example, conductive support plate 58 may be used to form the ground plane for one or more of the antennas 40 in device 10 and/or to form one or more edges of slot antenna resonating elements (e.g., slot antenna resonating elements formed from slot 60) for the antennas 40 in device 10. Peripheral conductive housing structures 12W may form an antenna resonating element arm (e.g., an inverted-F antenna resonating element arm) for one or more of the antennas 40 in device 10. If desired, a portion of peripheral conductive housing structures 12W and/or a portion of conductive support plate 58 (e.g., at edge 54 of slot 60) may form part of a conductive loop path used to form a loop antenna resonating element for antenna 40 that conveys radio-frequency signals in an NFC band.

Figure 5:
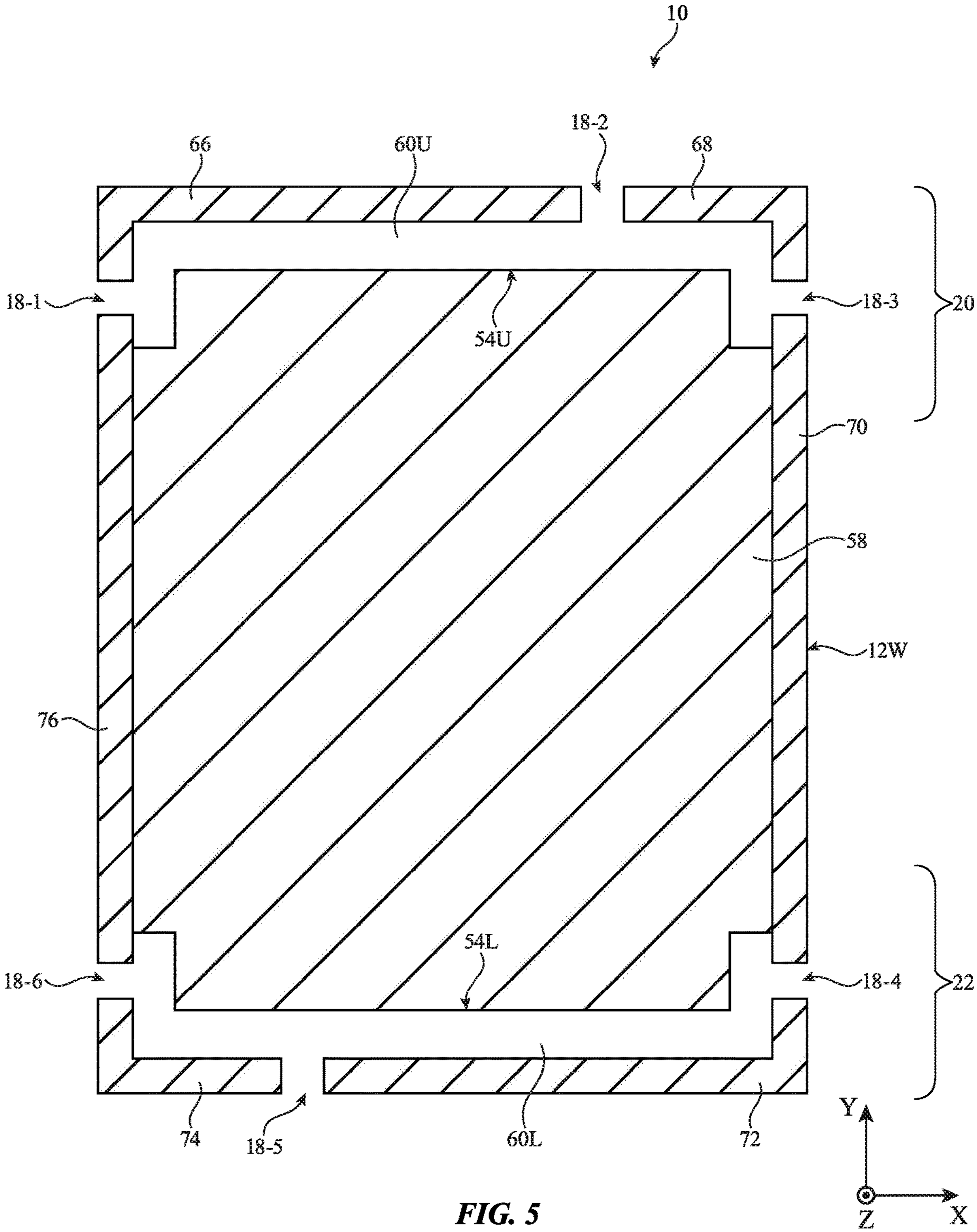
FIG. 5 is a top interior view of an illustrative electronic device having slots and segments of peripheral conductive housing structures that are used in forming multiple antennas for the electronic device in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how device 10 may include multiple slots 60 and may include multiple dielectric gaps that divide the peripheral conductive housing structures into segments. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10, a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, a third gap 18-3, a fourth gap 18-4, a fifth gap 18-5, and a sixth gap 18-6. Gaps 18-1, 18-2, 18-3, 18-4, 18-5, and 18-6 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 76 of peripheral conductive housing structures 12W from segment 66 of peripheral conductive housing structures 12W. Gap 18-2 may divide the second conductive sidewall to separate segment 66 from segment 68 of peripheral conductive housing structures 12W. Gap 18-3 may divide the third conductive sidewall to separate segment 68 from segment 70 of peripheral conductive housing structures 12W. Gap 18-4 may divide the third conductive sidewall to separate segment 70 from segment 72 of peripheral conductive housing structures 12W. Gap 18-5 may divide the fourth conductive sidewall to separate segment 72 from segment 74 of peripheral conductive housing structures 12W. Gap 18-6 may divide the first conductive sidewall to separate segment 74 from segment 76.

In this example, segment 66 forms the top-left corner of device 10 (e.g., segment 66 may have a bend at the corner) and is formed from the first and second conductive sidewalls of peripheral conductive housing structures 12W (e.g., in upper region 20 of device 10). Segment 68 forms the top-right corner of device 10 (e.g., segment 68 may have a bend at the corner) and is formed from the second and third conductive sidewalls of peripheral conductive housing structures 12W (e.g., in upper region 20 of device 10). Segment 72 forms the bottom-right corner of device 10 and is formed from the third and fourth conductive sidewalls of peripheral conductive housing structures 12W (e.g., in lower region 22 of device 10). Segment 74 forms the bottom-left corner of device 10 and is formed from the fourth and first conductive sidewalls of peripheral conductive housing structures 12W (e.g., in lower region 22 of device 10).

Conductive support plate 58 may extend between opposing sidewalls of peripheral conductive housing structures 12W. For example, conductive support plate 58 may extend from segment 76 to segment 70 of peripheral conductive housing structures 12W (e.g., across the width of device 10, parallel to the X-axis). Conductive support plate 58 may be welded or otherwise affixed to segments 76 and 70. In another suitable arrangement, conductive support plate 58, segment 76, and segment 70 may be formed from a single, integral (continuous) piece of machined metal (e.g., in a unibody configuration).

As shown in FIG. 5, device 10 may include multiple slots 60 (FIG. 4) such as an upper slot 60U in upper region 20 and a lower slot 60L in lower region 22. The lower edge of upper slot 60U may be defined by upper edge 54U of conductive support plate 58 (e.g., an edge of conductive support plate 58 such as edge 54 of FIG. 4). The upper edge of upper slot 60U may be defined by segments 66 and 68 (e.g., upper slot 60U may be interposed between conductive support plate 58 and segments 66 and 68 of peripheral conductive housing structures 12W). The upper edge of lower slot 60L may be defined by lower edge 54L of conductive support plate 58 (e.g., an edge of conductive support plate 58 such as edge 54 of FIG. 4). The lower edge of lower slot 60L may be defined by segments 74 and 72 (e.g., lower slot 60L may be interposed between conductive support plate 58 and segments 74 and 72 of peripheral conductive housing structures 12W).

Upper slot 60U may have an elongated shape extending from a first end at gap 18-2 to an opposing second end at gap 18-3 (e.g., upper slot 60U may span the width of device 10). Similarly, lower slot 60L may have an elongated shape extending from a first end at gap 18-6 to an opposing second end at gap 18-4 (e.g., lower slot 60L may span the width of device 10). Slots 60U and 60L may be filled with air, plastic, glass, sapphire, epoxy, ceramic, or other dielectric material. Upper slot 60U may be continuous with gaps 18-1, 18-2, and 18-3 in peripheral conductive housing structures 12W if desired (e.g., a single piece of dielectric material may be used to fill both upper slot 60U and gaps 18-1, 18-2, and 18-3). Similarly, lower slot 60L may be continuous with gaps 18-6, 18-5, and 18-4 if desired (e.g., a single piece of dielectric material may be used to fill both lower slot 60L and gaps 18-6, 18-5, and 18-4).

Conductive support plate 58, segment 66, segment 68, and portions of upper slot 60U may be used in forming multiple antennas 40 in upper region 20 of device 10 (sometimes referred to herein as upper antennas). Conductive support plate 58, portions of lower slot 60L, segment 74, and segment 72 may be used in forming multiple antennas 40 in lower region 22 of device 10 (sometimes referred to herein as lower antennas). If desired, one or more phased antenna arrays for conveying millimeter and centimeter wave signals may at least partially overlap upper slot 60L, conductive support plate 58, and/or lower slot 60L (not shown in FIG. 5 for the sake of clarity). The phased antenna arrays may radiate through display cover layer 64 of FIG. 4, through dielectric cover layer 56 of FIG. 4, and/or through one or more apertures in peripheral conductive housing structures 12W.

Figure 6:
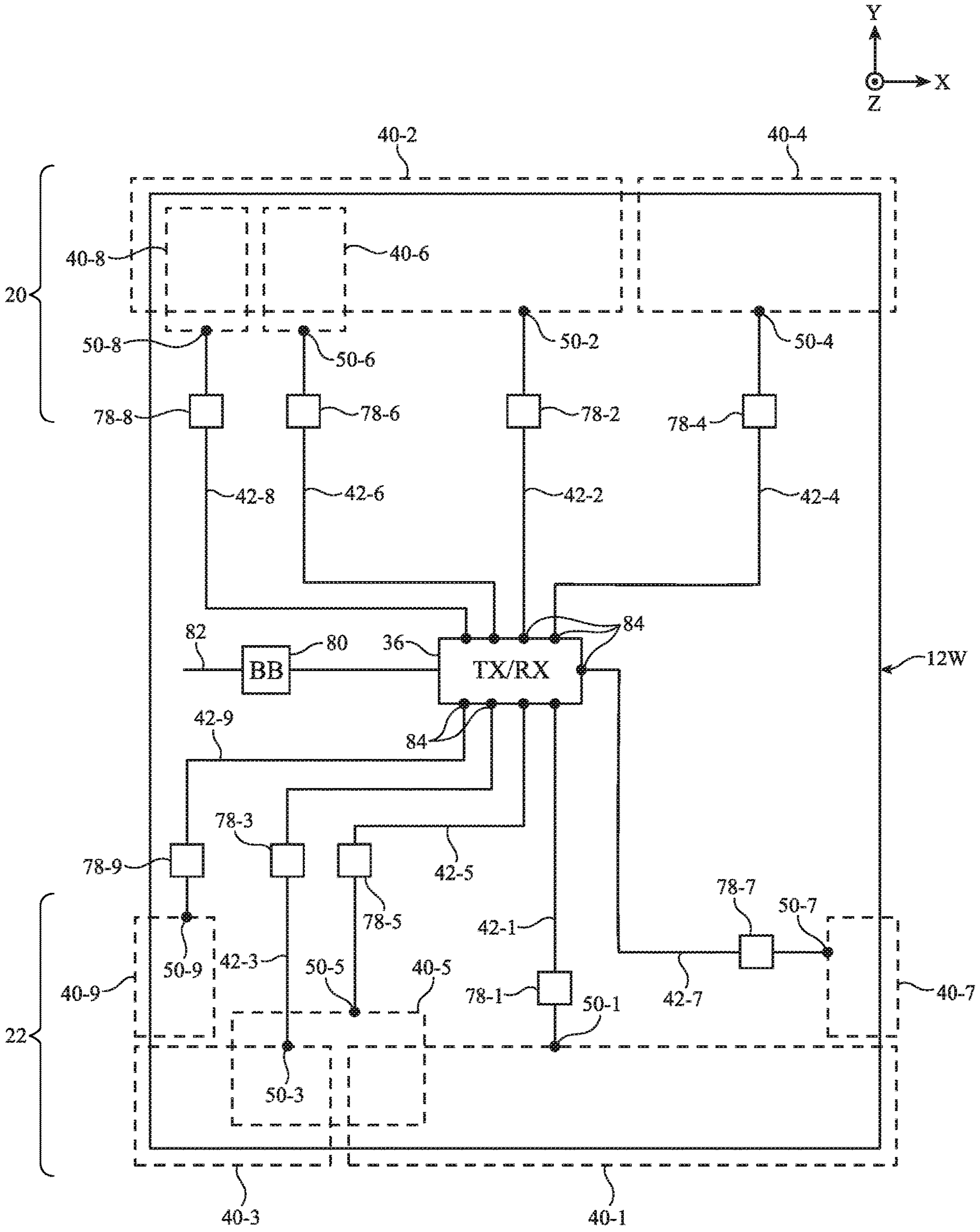
FIG. 6 is a diagram showing how an illustrative electronic device may include multiple antennas at different ends of the electronic device accordance with some embodiments.

FIG. 6 is diagram showing how device 10 may include multiple antennas 40 in upper region 20 and lower region 22. As shown in FIG. 6, device 10 may include four antennas 40 in upper region 20 such as antennas 40-2, 40-4, 40-8, and 40-6. Device 10 may also include five antennas 40 in lower region 22 such as antennas 40-1, 40-3, 40-5, 40-7, and 40-9. Each antenna may include a corresponding antenna feed 50 (e.g., antenna 40-1 may have antenna feed 50-1, antenna 40-2 may have antenna feed 50-2, antenna 40-3 may have antenna feed 50-3, etc.). This example is merely illustrative and, in general, device 10 may include any desired number of antennas 40.

The volume of antenna 40-6 may at least partially overlap the volume of antenna 40-2 and/or antenna 40-8 if desired. The volume of antenna 40-8 may at least partially overlap the volume of antenna 40-2 and/or antenna 40-6 if desired. In another suitable arrangement, antenna 40-8 may be omitted and antenna 40-6 may cover the frequencies that are otherwise covered by antenna 40-8. The volume of antenna 40-5 may at least partially overlap the volume of antennas 40-1 and/or 40-3 if desired. Antennas 40-9, 40-3, 40-1, 40-7,

40-4, 40-2, and optionally antennas 40-8 and 40-6 may each be formed from portions of peripheral conductive housing structures 12W and conductive support plate 58 (FIG. 5).

As shown in FIG. 6, the wireless circuitry in device 10 may include one or more input-output ports such as port 82 for interfacing with digital data circuits in storage and processing circuitry (e.g., control circuitry 38 of FIG. 2). Wireless circuitry 34 may include baseband circuitry such as baseband (BB) processor 80 coupled between port 82 and radio-frequency transceiver (TX/RX) circuitry 36. Port 82 may receive digital data (e.g., uplink data) from the control circuitry that is to be transmitted by radio-frequency transceiver circuitry 36. Incoming data (e.g., downlink data) that has been received by radio-frequency transceiver circuitry 36 and baseband processor 80 may be supplied to the control circuitry via port 82.

Radio-frequency transceiver circuitry 36 may include multiple transceiver ports 84 that are each coupled to a respective transmission line path 42 (e.g., a first transmission line path 42-1, a second transmission line path 42-2, a third transmission line path 42-3, etc.). Transmission line path 42-1 may couple a first transceiver port 84 of radio-frequency transceiver circuitry 36 to the antenna feed 50-1 of antenna 40-1. Transmission line path 42-2 may couple a second transceiver port 84 to the antenna feed 50-2 of antenna 40-2. Similarly, transmission line paths 42-3, 42-4, 42-5, 42-6, 42-7, 42-8, and 42-9 may each couple a respective transceiver port 84 to antenna feed 50-3 of antenna 40-3, antenna feed 50-4 of antenna 40-4, antenna feed 50-5 of antenna 40-5, antenna feed 50-6 of antenna 40-6, antenna feed 50-7 of antenna 40-7, antenna feed 50-8 of antenna 40-8, and antenna feed 50-9 of antenna 40-9, respectively.

Radio-frequency front end circuits 78 may be interposed on each transmission line path 42 (e.g., a first front end circuit 78-1 may be interposed on transmission line path 42-1, a second front end circuit 78-2 may be interposed on transmission line path 42-2, a third front end circuit 78-3 may be interposed on transmission line path 42-3, etc.). Front end circuits 78 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line path 42 to the corresponding antenna 40, networks of active and/or passive components such as antenna tuning components, radio-frequency coupler circuitry for gathering antenna impedance measurements, or any other desired radio-frequency circuitry. If desired, front end circuits 78 may include switching circuitry that is configured to selectively couple antennas 40-1 through 40-9 to different respective transceiver ports 84 (e.g., so that each antenna can handle communications for different transceiver ports 84 over time based on the state of the switching circuits in front end circuits 78). If desired, front end circuits 78 may include filtering circuitry (e.g., duplexers and/or diplexers) that allow the corresponding antenna to transmit and receive radio-frequency signals in one or more frequency bands at the same time (e.g., using a frequency domain duplexing (FDD) scheme). In general, any desired combination of antennas may transmit and/or receive radio-frequency signals at a given time.

Amplifier circuitry such as one or more power amplifiers may be interposed on transmission line paths 42 (e.g., within front end circuits 78 or elsewhere) and/or may be formed within radio-frequency transceiver circuitry 36 for amplifying radio-frequency signals output by radio-frequency transceiver circuitry 36 prior to transmission over antennas 40. Amplifier circuitry such as one or more low noise amplifiers may be interposed on transmission line paths 42 (e.g., within front end circuits 78 or elsewhere) and/or may be formed within radio-frequency transceiver circuitry 36 for amplifying radio-frequency signals received by antennas 40 prior to conveying the received signals to radio-frequency transceiver circuitry 36. In the example of FIG. 3, separate front end circuits 78 are interposed on each transmission line path 42. This is merely illustrative. If desired, two or more transmission line paths 42 may share the same front end circuit 78.

Radio-frequency transceiver circuitry 36 may, for example, include circuitry for converting baseband signals received from baseband processor 80 into corresponding radio-frequency signals. For example, radio-frequency transceiver circuitry 36 may include mixer circuitry for up-converting the baseband signals to radio-frequencies prior to transmission over antennas 40. Radio-frequency transceiver circuitry 36 may include digital to analog converter (DAC) and/or analog to digital converter (ADC) circuitry for converting signals between digital and analog domains. Radio-frequency transceiver circuitry 36 may include circuitry for converting radio-frequency signals received from antennas 40 over transmission line paths 42 into corresponding baseband signals. For example, radio-frequency transceiver circuitry 36 may include mixer circuitry for down-converting the radio-frequency signals to baseband frequencies prior to conveying the baseband signals to baseband processor 80. Baseband processor 80, front end circuits 78, and/or radio-frequency transceiver circuitry 36 may be formed on the same substrate, integrated circuit, integrated circuit package, or module, or two or more of these components may be formed on separate substrates, integrated circuits, integrated circuit packages, or modules.

If desired, each of the antennas 40-1 through 40-9 may handle radio-frequency communications in one or more frequency bands. FIG. 7 shows a table 86 that illustrates how antennas 40-1 through 40-9 of FIG. 6 may collectively cover each frequency band of operation for device 10.

Column 88 of table 86 lists different frequency bands of operation for device 10. Column 90 of table 86 lists exemplary frequency ranges corresponding to the frequency bands in column 88. Columns 92 of table 86 list whether antennas 40-1 through 40-9 are configured to cover each of the frequency bands listed in column 88. Frequency bands that are covered by two or more antennas may be covered using a multiple-input and multiple-output (MIMO) scheme if desired.

As shown by columns 88 and 90 of table 86, antennas 40-1 through 40-9 may collectively cover the cellular low band (LB) (e.g., from 600 to 960 MHz), the L5 GPS band at 1176 MHz, the cellular low-midband (LMB) (e.g., from 1400 to 1550 MHz), the L1 GPS band at 1575 MHz, the cellular midband (MB) (e.g., from 1700 to 2200 MHz), the cellular high band (HB) (e.g., from 2300 to 2700 MHz), the 2.4 GHz WLAN and WPAN bands (e.g., from 2400 to 2480 MHz), the cellular ultra-high band (UHB) (e.g., from 3300 to 5000 MHz and including the 5G NR FR1 bands N77, N78, and/or N79), the 5 GHz WLAN band (e.g., from about 5180 to about 5825 MHz), and one or more UWB bands (e.g., bands from about 6250 to 8250 MHz such as a first UWB band at 6.5 GHz and a second UWB band at 8.0 GHz).

As shown by columns 92 of table 86, antennas 40-1 and 40-2 may each cover the cellular low band and the cellular low-midband. Antenna 40-3 may cover the L5 GPS band. Antenna 40-2 may cover the L1 GPS band. Antennas 40-1, 40-2, 40-3, and 40-4 may each cover the cellular midband and the cellular high band. Antennas 40-3 and 40-4 may each cover the 2.4 GHz WLAN and WPAN bands. Antennas 40-4, 40-7, 40-8, and 40-9 (and optionally antenna 40-6) may each cover the cellular ultra-high band. Antennas 40-5 and 40-6 may each cover the 5 GHz WLAN band. If desired, antennas 40-5 and 40-6 may also cover LTE band B46 (e.g., from 5150 to 5925 MHz).

Antenna 40-6 or antenna 40-8 may cover the UWB band(s). In a first suitable arrangement that is sometimes described herein as an example, antenna 40-8 may be omitted and antenna 40-6 may cover the 5 GHz WLAN band, the UWB band(s), and the cellular ultra-high band. In a second suitable arrangement that is sometimes described herein as an example, antenna 40-6 may cover the 5 GHz WLAN band and the UWB band(s) without covering the cellular ultra-high band and antenna 40-8 may cover the cellular ultra-high band without covering the UWB band(s). In a third suitable arrangement that is sometimes described herein as an example, antenna 40-6 may cover the 5 GHz WLAN band without covering the UWB band(s) or the cellular ultra-high band and antenna 40-8 may cover the UWB band(s) and the cellular ultra-high band. If desired, the antennas that cover the UWB band(s) may convey radio-frequency signals in the UWB band(s) within the hemisphere over the front face of device 10 (e.g., display 14 of FIG. 1) and/or within the hemisphere under the rear face of device 10. While not illustrated in table 86, portions of antennas 40-2 and 40-4 may also be used to form a loop antenna resonating element for an NFC antenna that radiates in an NFC band.

In order to increase the overall data throughput of wireless circuitry 34 (FIG. 2), multiple antennas may be operated using a multiple-input and multiple-output (MIMO) scheme. When operating using a MIMO scheme, two or more antennas on device 10 may be used to concurrently convey multiple independent streams of wireless data at the same frequencies. This may significantly increase the overall data throughput between device 10 and the external communications equipment relative to scenarios where only a single antenna is used. In general, the greater the number of antennas that are used for conveying wireless data under the MIMO scheme, the greater the overall throughput of wireless circuitry 34.

If desired, the wireless circuitry may perform so-called two-stream (2X) MIMO operations (sometimes referred to herein as 2X MIMO communications or communications using a 2X MIMO scheme) in which two antennas 40 are used to convey two independent streams of radio-frequency signals at the same frequency. The frequency bands in table 86 that are covered by two or more antennas 40 may be used to perform 2X MIMO operations in those frequency bands, if desired. For example, the wireless circuitry may perform 2X MIMO operations in the cellular low band (e.g., using antennas 40-1 and 40-2), in the cellular low-midband (e.g., using antennas 40-1 and 40-2), in the cellular midband (e.g., using any desired pair of antennas 40-1 through 40-4), in the cellular high band (e.g., using any desired pair of antennas 40-1 through 40-4), in the 2.4 GHz WLAN band (e.g., using antennas 40-3 and 40-4), in the cellular ultra-high band (e.g., using any pair of antennas 40-4, 40-6, 40-7, 40-8, and 40-9), and/or in the 5 GHz WLAN band (e.g., using antennas 40-5 and 40-6).

If desired, the wireless circuitry may perform so-called four-stream (4X) MIMO operations (sometimes referred to herein as 4X MIMO communications or communications using a 4X MIMO scheme) in which four antennas 40 are used to convey four independent streams of radio-frequency signals at the same frequency. The frequency bands in table 86 that are covered by four or more antennas 40 may be used to perform 4X MIMO operations in those frequency bands, if desired. For example, the wireless circuitry may perform 4X MIMO operations in the cellular midband (e.g., using antennas 40-1 through 40-4), the cellular high band (e.g., using antennas 40-1 through 40-4), and/or in the cellular ultra-high band (e.g., using four of antennas 40-4, 40-6, 40-7, 40-8, and 40-9). Performing 4X MIMO operations may support higher overall data throughput than 2X MIMO operations because 4X MIMO operations involve four independent wireless data streams whereas 2X MIMO operations involve only two independent wireless data streams. Carrier aggregation schemes may also be used in performing wireless operations with antennas 40-1 through 40-9.

In this way, each of the antennas may collectively cover each of the frequency bands shown in table 86 with satisfactory antenna efficiency and maximal data throughput. The example of FIG. 7 is merely illustrative. In general, device 10 may include any desired number of antennas for covering any desired number of frequency bands at any desired frequencies.

Figure 8:
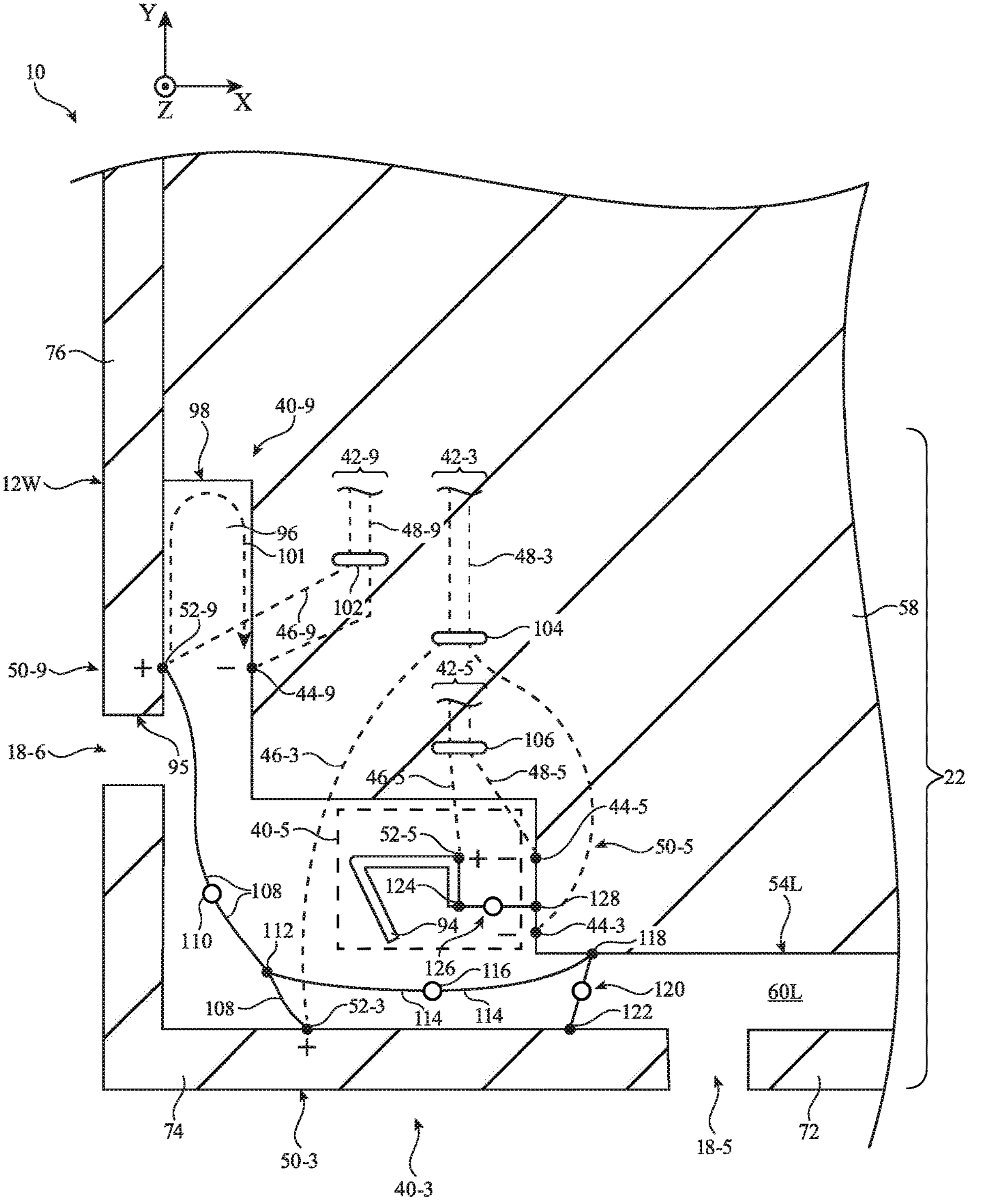
FIG. 8 is a top interior view of a corner of an illustrative electronic device having co-existing antennas in accordance with some embodiments.

If care is not taken, due to close physical proximity, it can be difficult for antennas 40-3, 40-5, and 40-9 in the bottom-left corner of device 10 (FIG. 6) to each convey radio-frequency signals in the corresponding frequency bands shown in columns 92 of FIG. 7 with satisfactory antenna efficiency. FIG. 8 is a top interior view showing how antennas 40-3, 40-5, and 40-9 may be formed within device 10 in a manner such that the antennas each cover the corresponding frequency bands with satisfactory antenna efficiency.

As shown in FIG. 8, at least segment 76 of peripheral conductive housing structures 12W and conductive support plate 58 may form part of the antenna ground for antennas 40-3, 40-5, and 40-9 in lower region 22 of device 10 (e.g., in the bottom-left corner of device 10). Additional conductive components such as conductive housing structures, conductive structures from electronic components, printed circuit board traces, strips of conductor such as strips of wire or metal foil, conductive display components, and/or other conductive structures may also form part of the antenna ground.

Antenna 40-9 may be an open slot antenna having an open slot antenna resonating element formed from extended portion 96 of lower slot 60L (e.g., an open slot antenna resonating element having edges defined by conductive support plate 58, segment 76, and/or other portions of the antenna ground and having an open end at gap 18-6). Extended portion 96 of lower slot 60L may extend between segment 76 and conductive support plate 58, along a longitudinal axis in the +Y direction, from a first end of lower slot 60L at gap 18-6. For example, extended portion 96 of lower slot 60L may have a closed end 98 that extends by a non-zero distance beyond end 100 of segment 76 (e.g., the end of segment 76 at gap 18-6). While extended portion 96 of lower slot 60L is continuous with lower slot 60L, extended portion 96 may sometimes be referred to herein as slot 96 (e.g., an open slot extending from the end of lower slot 60L at gap 18-6).

Antenna 40-9 may be fed using antenna feed 50-9. Antenna feed 50-9 may be coupled across extended portion 96 of lower slot 60L. For example, antenna feed 50-9 may have a positive antenna feed terminal 52-9 coupled to segment 76 (e.g., at or adjacent end 100) and may have a ground antenna feed terminal 44-9 coupled to conductive support plate 58. Antenna feed 50-9 may be coupled to a corresponding port 84 of transceiver circuitry 36 (FIG. 6) over transmission line path 42-9. Transmission line path 42-9 may include a signal conductor 46-9 coupled to positive antenna feed terminal 52-9 and a ground conductor 48-9 coupled to ground antenna feed terminal 44-9.

Transmission line path 42-9 and antenna feed 50-9 may convey radio-frequency signals in the cellular ultra-high band. Extended portion 96 of lower slot 60L may resonate in the cellular ultra-high band. Corresponding antenna currents for antenna 40-9 (e.g., currents in the cellular ultra-high band) may flow around the perimeter of extended portion 96 of lower slot 60L, as shown by arrow 101.

If desired, front end circuitry 102 for antenna 40-9 may be interposed on transmission line path 42-9. Front end circuitry 102 may form a part of front-end circuit 78-9 of FIG. 6, for example. Front end circuitry 102 may include one or more antenna tuning components (e.g., components having fixed and/or adjustable inductors, capacitors, resistors, filters, and/or switches coupled together in any desired arrangement), impedance matching circuitry, switching circuitry, and/or any other desired circuitry for controlling the radio-frequency operation/performance of antenna 40-9. One or more antenna tuning components may additionally or alternatively be coupled across extended portion 96 of lower slot 60L if desired. The frequency response of antenna 40-9 may be determined by the length of the perimeter of extended portion 96 of lower slot 60L, one or more harmonic modes of extended portion 96, contribution from one or more parasitic elements, antenna tuning components coupled across extended portion 96 of lower slot 60L, and/or front end circuitry 102, for example.

As shown in FIG. 8, antenna 40-3 may have an antenna resonating element arm (e.g., an inverted-F antenna resonating element arm) formed from segment 74 of peripheral conductive housing structures 12W. Antenna 40-3 may be fed using antenna feed 50-3. Antenna feed 50-3 may be coupled across lower slot 60L. For example, antenna feed 50-3 may have a positive antenna feed terminal 52-3 coupled to segment 74 and may have a ground antenna feed terminal 44-3 coupled to conductive support plate 58. Antenna feed 50-3 may be coupled to a corresponding port 84 of transceiver circuitry 36 (FIG. 6) over transmission line path 42-3. Transmission line path 42-3 may include a signal conductor 46-3 coupled to positive antenna feed terminal 52-3 and a ground conductor 48-3 coupled to ground antenna feed terminal 44-3.

Transmission line path 42-3, antenna feed 50-3, and antenna 40-3 may convey radio-frequency signals in the L5 GPS band, the cellular midband, the cellular high band, and the 2.4 GHz WLAN and WPAN band. Corresponding antenna currents for antenna 40-3 (e.g., currents in the L5 GPS band, the cellular midband, the cellular high band, and the 2.4 GHz WLAN and WPAN band) may flow along segment 74 and conductive support plate 58 (e.g., at lower edge 54L).

If desired, antenna 40-3 may include one or more return paths coupled between segment 74 and the antenna ground such as a return path formed by antenna tuning component 120. Antenna tuning component 120 may have a first terminal 118 coupled to conductive support plate 58 (e.g., at lower edge 54L) and a second terminal 122 coupled to segment 74. Terminal 122 may be interposed on segment 74 between positive antenna feed terminal 52-3 and gap 18-5. Antenna tuning component 120 may include any desired capacitive, resistive, inductive, and/or switching components arranged in any desired manner between terminals 118 and 122. In another suitable arrangement, antenna tuning component 120 may form a short circuit path to ground from terminal 122 at the frequencies of operation of antenna 40-3.

If desired, front end circuitry 104 for antenna 40-3 may be interposed on transmission line path 42-3. Front end circuitry 104 may form a part of front-end circuit 78-3 of FIG. 6, for example. Front end circuitry 104 may include one or more antenna tuning components (e.g., components having fixed and/or adjustable inductors, capacitors, resistors, filters, and/or switches coupled together in any desired arrangement), impedance matching circuitry, switching circuitry, and/or any other desired circuitry for controlling the radio-frequency operation/performance of antenna 40-3. The frequency response of antenna 40-3 may be determined by the length of segment 74 (e.g., the length of segment 74 extending from one or both sides of positive antenna feed terminal 52-3), one or more harmonic modes of segment 74 and/or lower slot 60L, front end circuitry 104, and/or antenna tuning component 120, for example. If desired, moving positive antenna feed terminal 52-3 towards gap 18-6 and moving terminal 122 towards gap 18-5 may serve to increase the high band frequency response of antenna 40-3.

Antenna 40-5 may have an antenna resonating element arm 94 formed from conductive traces on a flexible printed circuit or another substrate (not shown in FIG. 8 for the sake of clarity). Antenna resonating element arm 94 may at least partially (e.g., completely) overlap lower slot 60L. Antenna 40-5 may be fed using antenna feed 50-5. Antenna feed 50-5 may be coupled across lower slot 60L. For example, antenna feed 50-5 may have a positive antenna feed terminal 52-5 coupled to antenna resonating element arm 94 and may have a ground antenna feed terminal 44-5 coupled to conductive support plate 58. Antenna feed 50-5 may be coupled to a corresponding port 84 of transceiver circuitry 36 (FIG. 6) over transmission line path 42-5. Transmission line path 42-5 may include a signal conductor 46-5 coupled to positive antenna feed terminal 52-5 and a ground conductor 48-5 coupled to ground antenna feed terminal 44-5.

Transmission line path 42-5, antenna feed 50-5, and antenna 40-5 may convey radio-frequency signals in the 5 GHz WLAN band. Corresponding antenna currents for antenna 40-5 (e.g., currents in the 5 GHz WLAN band) may flow along segment 74 and conductive support plate 58 (e.g., at lower edge 54L). If desired, antenna 40-5 may include one or more return paths coupled between antenna resonating element arm 94 and the antenna ground such as a return path formed by antenna tuning component 126. Antenna tuning component 126 may have a first terminal 128 coupled to conductive support plate 58 (e.g., at lower edge 54L) and a second terminal 124 coupled to antenna resonating element arm 94. In one suitable arrangement, terminal 128 is interposed on lower edge 54L between ground antenna feed terminal 44-5 and ground antenna feed terminal 44-3, whereas ground antenna feed terminal 44-3 is interposed between terminals 128 and 118. If desired, two or more of ground antenna feed terminal 44-5, terminal 128, ground antenna feed terminal 44-3, and terminal 118 may be coupled to the same location (point) on conductive support plate 58 (e.g., using the same grounding screw).

If desired, front end circuitry 106 for antenna 40-5 may be interposed on transmission line path 42-5. Front end circuitry 106 may form a part of front-end circuit 78-5 of FIG. 6, for example. Front end circuitry 106 may include one or more antenna tuning components (e.g., components having fixed and/or adjustable inductors, capacitors, resistors, filters, and/or switches coupled together in any desired arrangement), impedance matching circuitry, switching circuitry, and/or any other desired circuitry for controlling the radio-frequency operation/performance of antenna 40-5. The frequency response of antenna 40-5 may be determined by the length of antenna resonating element arm 94, one or more harmonic modes of antenna resonating arm 94, front end circuitry 106, and/or antenna tuning component 126, for example.

If desired, extended portion 96 of lower slot 60L may also contribute to the frequency response of antenna 40-3. Antenna 40-3 may include a conductive path such as conductive path 108 that couples positive antenna feed terminal 52-3 to positive antenna feed terminal 52-9. Antenna feed 50-9 and antenna 40-9 may be inactive (e.g., switched off) while antenna 40-3 is operating or may, if desired, remain active while antenna 40-3 is operating (e.g., antenna feed 50-9 and transmission line path 42-9 may continue to convey radio-frequency signals in the cellular ultra-high band while antenna 40-3 receives radio-frequency signals in the L5 GPS band).

In practice, extended portion 96 of lower slot 60L may be too short on its own for antenna 40-3 to cover lower frequencies such as frequencies in the L5 GPS band. An antenna tuning component such as antenna tuning component 110 may be interposed on conductive path 108 to help recover a frequency response for antenna 40-3 in the L5 GPS band. Antenna tuning component 110 may include any desired resistive, inductive, capacitive, and/or switching components arranged in any desired manner In one suitable arrangement, antenna tuning component 110 may include one or more capacitors that are turned on to increase the capacitance of antenna tuning component 110 when antenna 40-3 is receiving radio-frequency signals in the L5 GPS band (e.g., the increased capacitance on conductive path 108 may serve to effectively increase the length of extended portion 96 of lower slot 60L, thereby pulling the response of antenna 40-3 to lower frequencies that include the L5 GPS band). The capacitors may, if desired, be turned off to decrease the capacitance of antenna tuning component 110 when antenna 40-3 is not conveying radio-frequency signals in the L5 GPS band. The capacitors may also, if desired, serve to increase the cellular high band response of antenna 40-3.

In order to recover a frequency response of antenna 40-3 in both the cellular midband and the cellular high band (e.g., so antenna 40-3 can concurrently convey radio-frequency signals in both the cellular midband and the cellular high band), an additional conductive path such as conductive path 114 may couple conductive path 108 to conductive support plate 58. For example, as shown in FIG. 8, conductive path 114 may couple node 112 on conductive path 108 to terminal 118 on conductive support plate 58. Node 112 may be interposed on conductive path 108 between antenna tuning component 110 and positive antenna feed terminal 52-3, as an example. In another suitable arrangement, conductive path 114 may be coupled to a point on conductive support plate 58 other than terminal 118.

An antenna tuning component such as antenna tuning component 116 may be interposed on conductive path 114. Antenna tuning component 116 may include any desired resistive, inductive, capacitive, and/or switching components arranged in any desired manner. In general, the state of antenna tuning component 116, antenna tuning component 110, and/or antenna tuning components in front end circuit 104 may be adjusted to allow antenna 40-3 to cover a selected one or both of the cellular midband and the cellular high band at any given time. The example of FIG. 8 is merely illustrative. Lower slot 60L, segment 74, segment 72, and antenna resonating element arm 94 may have other shapes (e.g., shapes having any desired number of straight and/or curved portions and any desired number of straight and/or curved edges).

Figure 9:
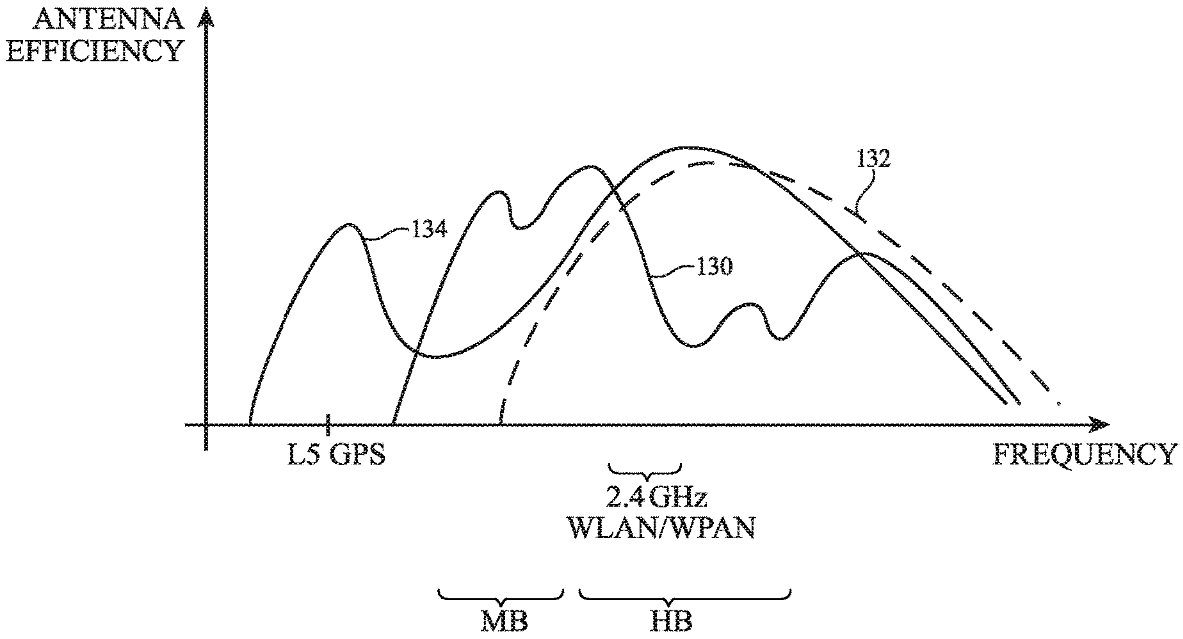
FIG. 9 is a plot of antenna performance (antenna efficiency) as a function of frequency for an illustrative antenna in accordance with some embodiments.

FIG. 9 is a plot of antenna efficiency as a function of frequency for antenna 40-3. As shown in FIG. 9, dashed curve 132 plots the frequency response of antenna 40-3 when antenna tuning component 116 is placed in a first state in which antenna tuning component 116 forms an open circuit between node 112 and terminal 118 (FIG. 8) and in which antenna tuning component 110 is placed in a first state in which antenna tuning component 110 exhibits a given capacitance (e.g., 1 pF). As shown by curve 132, when configured in this way, antenna 40-3 may exhibit a response peak in the cellular high band (HB) and the 2.4 GHz WLAN and WPAN band. This response peak may also cover higher frequencies of the cellular midband (MB). However, when configured in this way, antenna 40-3 may exhibit insufficient efficiency at lower frequencies in the cellular midband or the L5 GPS band.

Curve 130 plots the frequency response of antenna 40-3 when antenna tuning component 116 is placed in the first state (e.g., where antenna tuning component 116 forms an open circuit between node 112 and terminal 118) and when antenna tuning component 110 is placed in a second state in which antenna tuning component 110 exhibits a given inductance (e.g., 1.8 nH). As shown by curve 130, when configured in this way, antenna 40-3 may exhibit response peaks in the cellular midband and the cellular high band. These response peaks may also cover the 2.4 GHz WLAN and WPAN band. While this state may involve less cellular high band efficiency than the state associated with curve 132, antenna 40-3 may still convey radio-frequency signals in the cellular high band in this state, if desired (e.g., the state associated with curve 130 may be used when midband communications is prioritized over high band communications). However, when configured in this way, antenna 40-3 may still exhibit insufficient efficiency at lower frequencies in the cellular midband or the L5 GPS band.

Curve 134 plots the frequency response of antenna 40-3 when antenna tuning component 116 is placed in a second state (e.g., where antenna tuning component 116 forms a short circuit path between node 112 and terminal 118) and when antenna tuning component 110 is placed in a third state (e.g., where antenna tuning component 110 forms a short circuit impedance between node 112 and positive antenna feed terminal 52-9). As shown by curve 130, when configured in this way, antenna 40-3 may exhibit response peaks in the L5 GPS band, in the cellular high band, and the 2.4 GHz WLAN and WPAN band. These response peaks may also cover the cellular midband. While this state may involve less cellular midband efficiency than the state associated with curve 130, antenna 40-3 may still convey radio-frequency signals in the cellular midband in this state, if desired. This state may allow antenna 40-3 to concurrently cover the L5 GPS band in addition to the cellular midband, the cellular high band, and the 2.4 GHz WLAN and WPAN band.

The example of FIG. 9 is merely illustrative. Curves 130, 132, and 134 may have other shapes in practice. Antenna 40-3 may have any desired number of response peaks at any desired frequencies. In another suitable arrangement, conductive path 114 and antenna tuning component 116 (FIG. 8) may be omitted from antenna 40-3. In this arrangement, the impedance of antenna tuning component 110 may be selected (e.g., by selectively coupling a desired inductance and/or capacitance between node 112 and positive antenna feed terminal 52-9) so that antenna 40-3 can concurrently convey radio-frequency signals in each of the L5 GPS band, the cellular midband, the 2.4 GHz WLAN and WPAN band, and the cellular high band.

If desired, the state of one or more antenna tuning components in front end circuitry 104 (FIG. 8) may also be used to select a desired frequency response of antenna 40-3. As an example, front end circuitry 104 may include a series single-pole-four-throw (SP4T) switch that couples a selected one of three series inductors or a shunt resistor to antenna feed 40-3. In this scenario, antenna 40-3 may have a first state in which antenna tuning component 110 has a first inductance (e.g., 56 nH), antenna tuning component 116 forms a short circuit impedance between node 112 and terminal 118, and the SP4T has a first configuration. In this first state, antenna 40-3 may convey radio-frequency signals in the cellular high band, the 2.4 GHz WLAN and WPAN band, and the L5 GPS band. Antenna 40-4 may also have a second state in which antenna tuning component 110 has a second inductance (e.g., 3.4 nH), antenna tuning component 116 forms a short circuit impedance between node 112 and terminal 118, and the SP4T has a second configuration. In this second state, antenna 40-3 may convey radio-frequency signals in the cellular midband. Antenna 40-4 may also have a third state in which antenna tuning component 110 has a third inductance (e.g., 1.8 nH), antenna tuning component 116 forms an open circuit impedance between node 112 and terminal 118, and the SP4T has a third configuration. In this third state, antenna 40-3 may convey radio-frequency signals in the cellular midband. These examples are merely illustrative and, in general, antenna 40-3 may have any desired tuning states.

Figure 10:
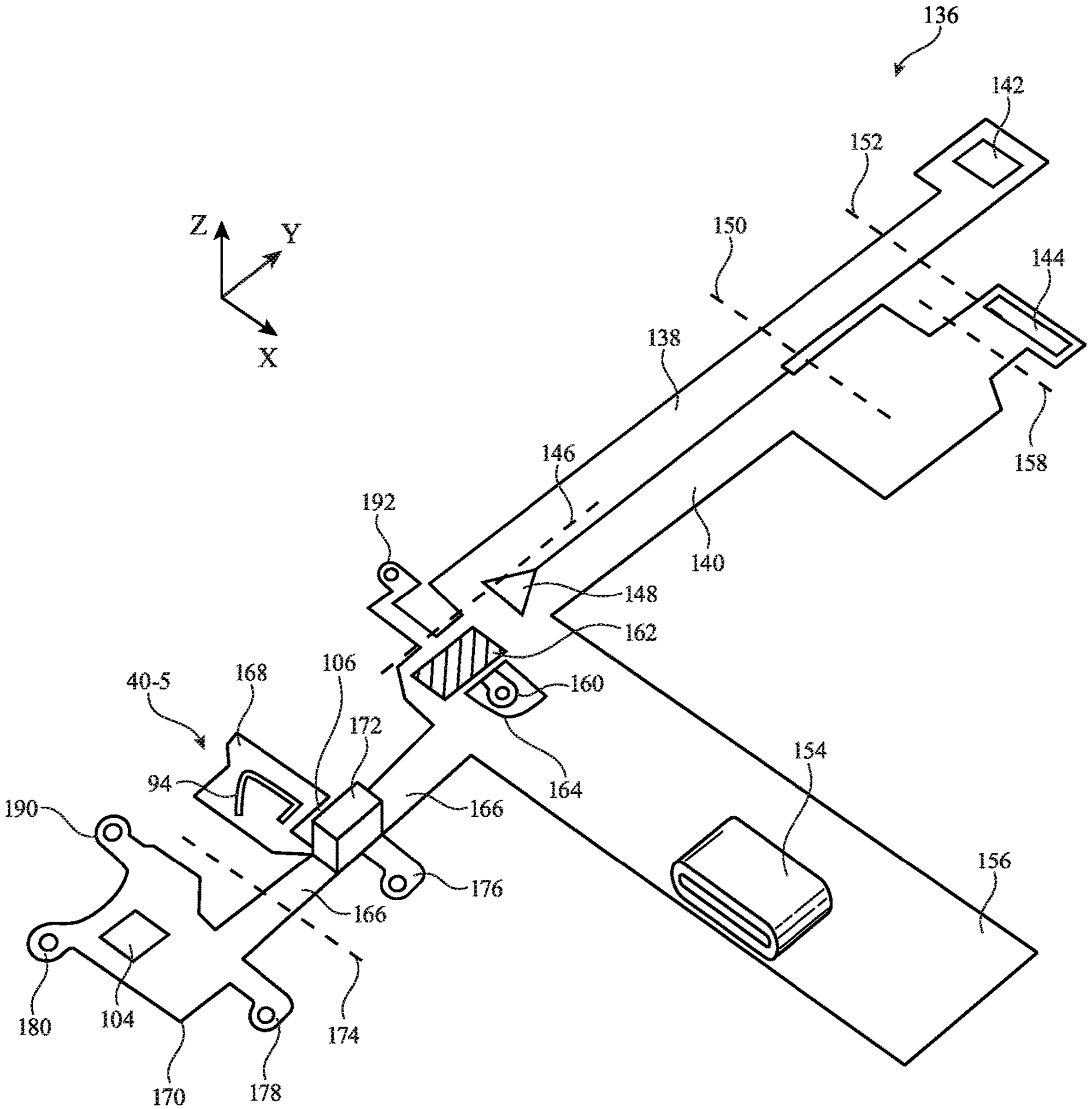
FIG. 10 is a perspective view of an illustrative flexible printed circuit having structures for coexisting antennas in accordance with some embodiments.

If desired, radio-frequency components for supporting antenna 40-9, antenna 40-3, and antenna 40-5 may be mounted to the same flexible printed circuit in device 10. FIG. 10 is a perspective view of an illustrative flexible printed circuit that includes radio-frequency components for supporting antennas 40-9, 40-3, and 40-5.

As shown in FIG. 10, a flexible printed circuit such as flexible printed circuit 136 may be provided in device 10. Flexible printed circuit 136 may have a main portion 156. A dock port such as dock 154 may be mounted to main portion 156. Dock 154 may be aligned with an opening in peripheral conductive housing structures 12W (FIG. 1). Dock 154 may receive wired power and/or may convey data with external equipment, for example. Main portion 156 may therefore sometimes be referred to herein as dock portion 156 and flexible printed circuit 136 may sometimes be referred to herein as dock flex 136.

Dock flex 136 may have first and second flexible printed circuit tails such as tails 138 and 140 that extend from a first side of dock portion 156 (e.g., in the +Y or "northern" direction). Dock flex 136 may have a third flexible printed circuit tail such as tail 166 extending from a second side of dock portion 156 (e.g., in the −Y or "southern" direction). When mounted within device 10, tails 138 and 140 may extend towards upper region 20 of device 10 (FIG. 1), whereas tail 166 extends towards segment 74 of peripheral conductive housing structures 12W (FIG. 8).

A radio-frequency connector such as radio-frequency connector 142 (e.g., a radio-frequency board-to-board connector) may be mounted to the end of tail 138. Transmission line paths 42-9, 42-3, and 42-5 for antennas 40-9, 40-3, and 40-5 (FIG. 8) may run from dock portion 156 to radio-frequency connector 142 through tail 138. The transmission lines for antennas 40-1 and 40-7 (FIG. 6) may also run through tail 138 and dock portion 156. Radio-frequency connector 142 may be coupled to a main logic board used to mount transceiver circuitry 36 (FIG. 6), for example.

A board-to-board connector such as board-to-board connector 144 may be mounted to tail 140. Board-to-board connector 144 may be coupled to control circuitry 16 (FIG. 1) and/or other components in device 10. Conductive paths such as control paths, power lines, data paths, and/or any other desired conductive paths may be coupled to board-to-board connector 144 through tail 140. The conductive paths may include, for example, control paths for controlling the operation of front end circuitry 102, 104, and 106 (FIG. 8), data and power lines coupled to dock 154, etc.

If desired, tails 138 and 140 may be created by cutting a sheet of flexible printed circuit material used to form dock flex 136. Tail 138 may abut tail 140 along its length to maximize the space on dock flex 136 for transmission lines and conductive paths. Dock flex 136 may include a joint opening 148 at the base of tails 138 and 140 (e.g., where tails 138 and 140 meet dock portion 156). Joint opening 148 may allow tails 138 and 140 to be folded with respect to dock portion 156 while maximizing the width of tails 138 and 140, for example. One or both of tails 138 and 140 may be grounded at one or more locations along their respective lengths, if desired.

As shown in FIG. 10, a conductive feed clip such as feed clip 192 may be mounted to dock portion 156 of dock flex 136. When mounted within device 10, feed clip 192 may be coupled to segment 76 of peripheral conductive housing structures 12W to form positive antenna feed terminal 52-9 for antenna 40-9 (FIG. 8) (e.g., using a conductive screw inserted through a hole in feed clip 192 and attached to a threaded screw boss in the peripheral conductive housing structures). Dock portion 156 may also include an opening such as opening 164. A conductive grounding clip such as grounding clip 160 may overlap opening 164. Grounding clip 160 may be used to form ground antenna feed terminal 44-9 of FIG. 8 (e.g., using a conductive screw that couples grounding clip 160 to conductive support plate 58 through opening 164).

Front end circuitry 102 for antenna 40-9 (FIG. 8) may also be mounted to dock portion 156 of dock flex 136 (e.g., transmission line path 42-9 of FIG. 8 may extend from radio-frequency connector 142, through tail 138 and dock portion 156 to front end circuitry 102). An electromagnetic shielding layer such as engine cover 162 may cover front end circuitry 102 on dock portion 156. Engine cover 162 may include ferrite and/or conductive materials (e.g., a plastic sheet with a metal cover layer) that help to shield antennas 40-9, 40-5, and/or 40-3 from other components in device 10. Engine cover 162 may, for example, serve to increase the antenna efficiency of at least antenna 40-5 (e.g., by increasing electromagnetic isolation between antenna 40-5 and other components in device 10 such as display 14 of FIG. 1).

Dock flex 136 may include a first portion (region) 168 coupled to (extending from) one side of tail 166. Dock flex 136 may also include a second portion (region) 170 at the end of tail 166 (e.g., tail 166 may couple second portion 170 to dock portion 156 of dock flex 136). Antenna resonating element arm 94 for antenna 40-5 may be formed from conductive traces on first portion 168, for example. Front end circuitry 106 for antenna 40-5 may also be mounted (e.g., surface-mounted) to first portion 168 (e.g., transmission line path 42-5 of FIG. 8 may extend from radio-frequency connector 142, through tail 138, dock portion 156, and tail 166 to antenna resonating element arm 94 through front end circuitry 106). A conductive grounding clip such as grounding clip 176 may be mounted to tail 166 at first portion 168. Grounding clip 176 may be used to form ground antenna feed terminal 44-5 and/or terminal 128 of FIG. 8 (e.g., using a conductive screw that couples grounding clip 176 to conductive support plate 58).

A dielectric substrate such as plastic support block 172 may be mounted to tail 166 at first portion 168. Plastic support block 172 may be formed from injection molded plastic, as an example. If desired, grounding clip 176 may be molded within plastic support block 172. Plastic support block 172 may be used to support the folding of tail 166 when mounting dock flex 136 into device 10.

Front end circuitry 104 for antenna 40-3 (FIG. 8) may be mounted (e.g., surface-mounted) to second portion 170 of dock flex 136. A conductive grounding clip such as grounding clip 178 may be mounted to second portion 170 of dock flex 136. Grounding clip 178 may be used to form ground antenna feed terminal 44-3 and/or terminal 118 of FIG. 8 (e.g., using a conductive screw that couples grounding clip 178 to conductive support plate 58). Antenna tuning component 116 and/or antenna tuning component 110 of FIG. 8 may also be mounted to second portion 170 of dock flex 136 if desired.

A conductive feed clip such as feed clip 190 may be mounted (e.g., surface-mounted) to second portion 170 of dock flex 136. When mounted within device 10, feed clip 190 may be coupled to segment 74 of peripheral conductive housing structures 12W to form positive antenna feed terminal 52-3 for antenna 40-3 (FIG. 8) (e.g., using a conductive screw inserted through a hole in feed clip 190 and attached to a threaded screw boss in the peripheral conductive housing structures). Transmission line path 42-3 of FIG. 8 may, for example, extend from radio-frequency connector 142, through tail 138, dock portion 156, tail 166, and front end circuitry 104 to feed clip 190.

A conductive bridging clip such as bridging clip 180 may be mounted (e.g., surface-mounted) to second portion 170 of dock flex 136. When mounted within device 10, bridging clip 180 may be coupled to feed clip 192 and segment 76 of peripheral conductive housing structures 12W (e.g., at positive antenna feed terminal 52-9 of FIG. 8). A conductive trace on second portion 170 of dock flex 136 may couple antenna tuning component 110 on second portion 170 between feed clip 192 and bridging clip 180. In this way, feed clip 190, the conductive trace, antenna tuning component 110, and bridging clip 180 may form conductive path 108 of FIG. 8 for coupling positive antenna feed terminal 52-3 of antenna 40-3 to positive antenna feed terminal 52-9 of antenna 40-9.

Figure 11:
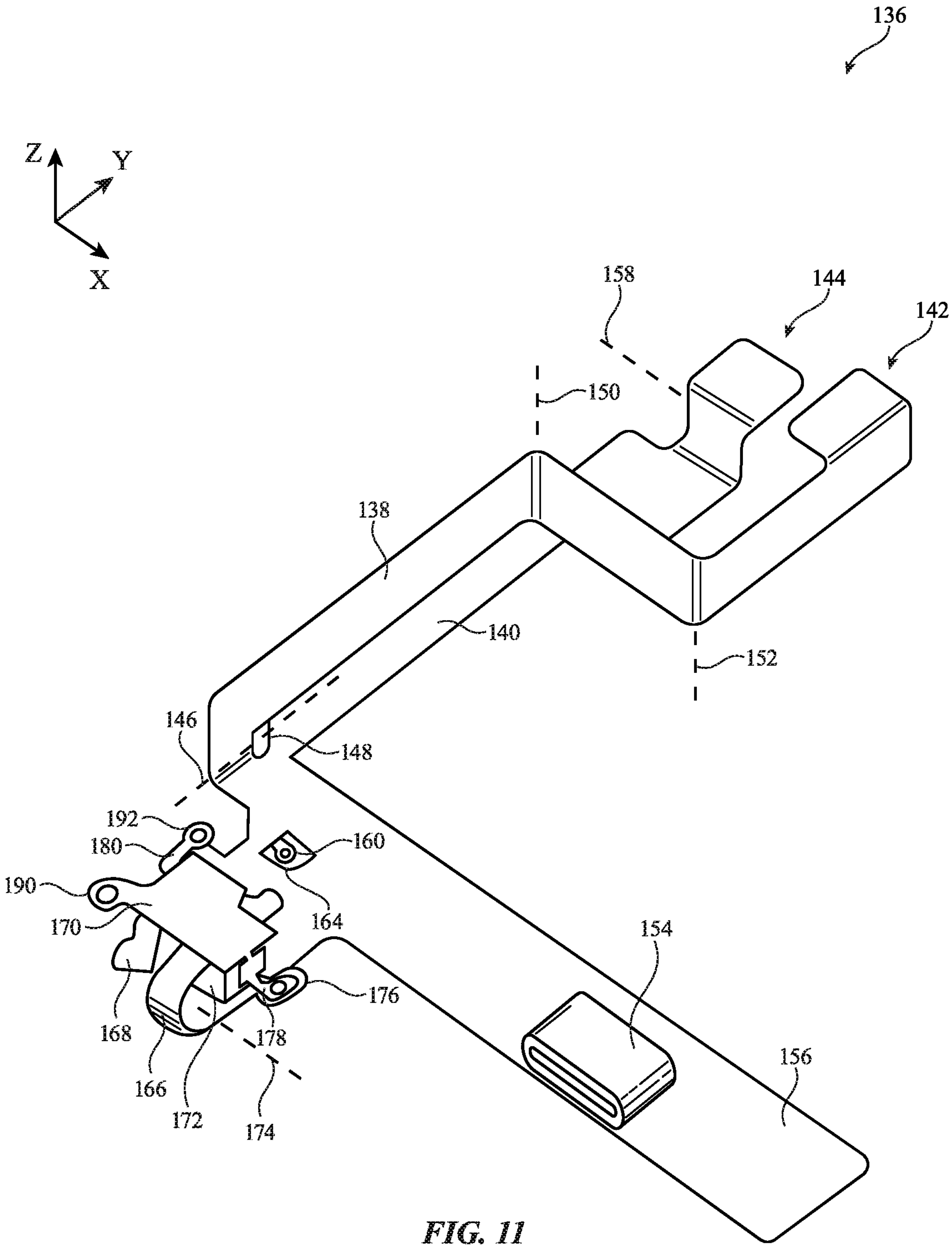
FIG. 11 is a perspective view showing how an illustrative flexible printed circuit of the type shown in FIG. 10 may be folded for integration within a device in accordance with some embodiments.

In the example of FIG. 10, dock flex 136 is in a flat, unfolded state. If desired, dock flex 136 may be folded about one or more axes for mounting within device 10. For example, tail 140 may be folded about axis 158. Tail 138 may be folded about axes 150 and 152. Tail 138 may also be folded, with respect to dock portion 156, about axis 148. Tail 166 may be folded about axis 174. FIG. 11 is a perspective view of dock flex 136 in one illustrative folded state.

As shown in FIG. 11, tail 138 may be folded upwards about axis 146 (e.g., at joint opening 148). Axis 146 may extend parallel to the Y-axis of FIG. 11, for example. Tail 138 may also be folded to the right about axis 150 and to the left about axis 152. Axes 150 and 152 may extend parallel to the Z-axis of FIG. 11, for example. Folding (bending) tail 138 about axis 148 may allow tail 138 to extend along the periphery of a battery for device 10 (e.g., the vertical portion of tail 138 may be laterally interposed between the peripheral edge of the battery and segment 76 of peripheral conductive housing structures 12W of FIG. 5).

At the same time, tail 140 may extend under the bottom surface of the battery (e.g., tail 140 may be interposed between the battery and conductive support plate 58). Folding tail 138 about axes 150 and 152 may allow tail 138 to wrap around a logic board and/or SIM card tray for device 10. Tail 140 may be folded about axis 158 (e.g., an axis extending parallel to the X-axis of FIG. 11) to mount radio-frequency connector 142 to a corresponding radio-frequency connector on a logic board. Folding dock flex 136 in this way may allow antennas 40-3, 40-5, and 40-9 to be fed while occupying a minimal volume in device 10, thereby allowing as much space as possible for other components in device 10 (e.g., a larger battery than would otherwise fit within device 10).

As shown in FIG. 11, tail 166 may be folded about axis 174 and around plastic support block 172 (e.g., around the southern side of plastic support block 172 that faces the lower end of device 10). Axis 174 may extend parallel to the X-axis of FIG. 11, for example. The folded (bent) portion of tail 166 may be laterally interposed between plastic support block 172 and segment 74 of peripheral conductive housing structures 12W (FIG. 8). Similarly, plastic support block 172 may be laterally interposed between the folded portion of tail 166 and dock portion 156 of dock flex 136. Folding tail 166 about the southern side of plastic support block 172 may serve to increase antenna efficiency for antenna 40-5 relative to scenarios where tail 166 is unfolded, for example.

Folding tail 166 about axis 174 may place second portion 170 of dock flex 136 over the top surface of plastic support block 172 (e.g., plastic support block 172 may be vertically interposed between first portion 168 and second portion 170 of dock flex 136 and second portion 170 may at least partially overlap first portion 168). This may also serve to place bridging clip 180 over feed clip 192 on dock portion 156. If desired, the same conductive screw may be inserted into bridging clip 180 and feed clip 192 to couple the clips to segment 76 of peripheral conductive housing structures 12W (e.g., to couple signal conductor 46-9 of transmission line path 42-9 to positive antenna feed terminal 52-9 via feed clip 192 and to couple positive antenna feed terminal 52-3 to positive antenna feed terminal 52-9 via bridging clip 180, feed clip 190, and conductive path 108 of FIG. 8).

At the same time, when folded, grounding clip 178 on second portion 170 may be placed into contact with grounding clip 176. The same conductive screw may be inserted into grounding clips 176 and 178 to short grounding clips 176 and 178 to the same point on conductive support plate 58 (FIG. 8), for example. When folded, feed clip 190 may be oriented in a manner that allows feed clip 190 to be coupled (e.g., screwed into) segment 74 of peripheral conductive housing structures 12W.

Figure 12:
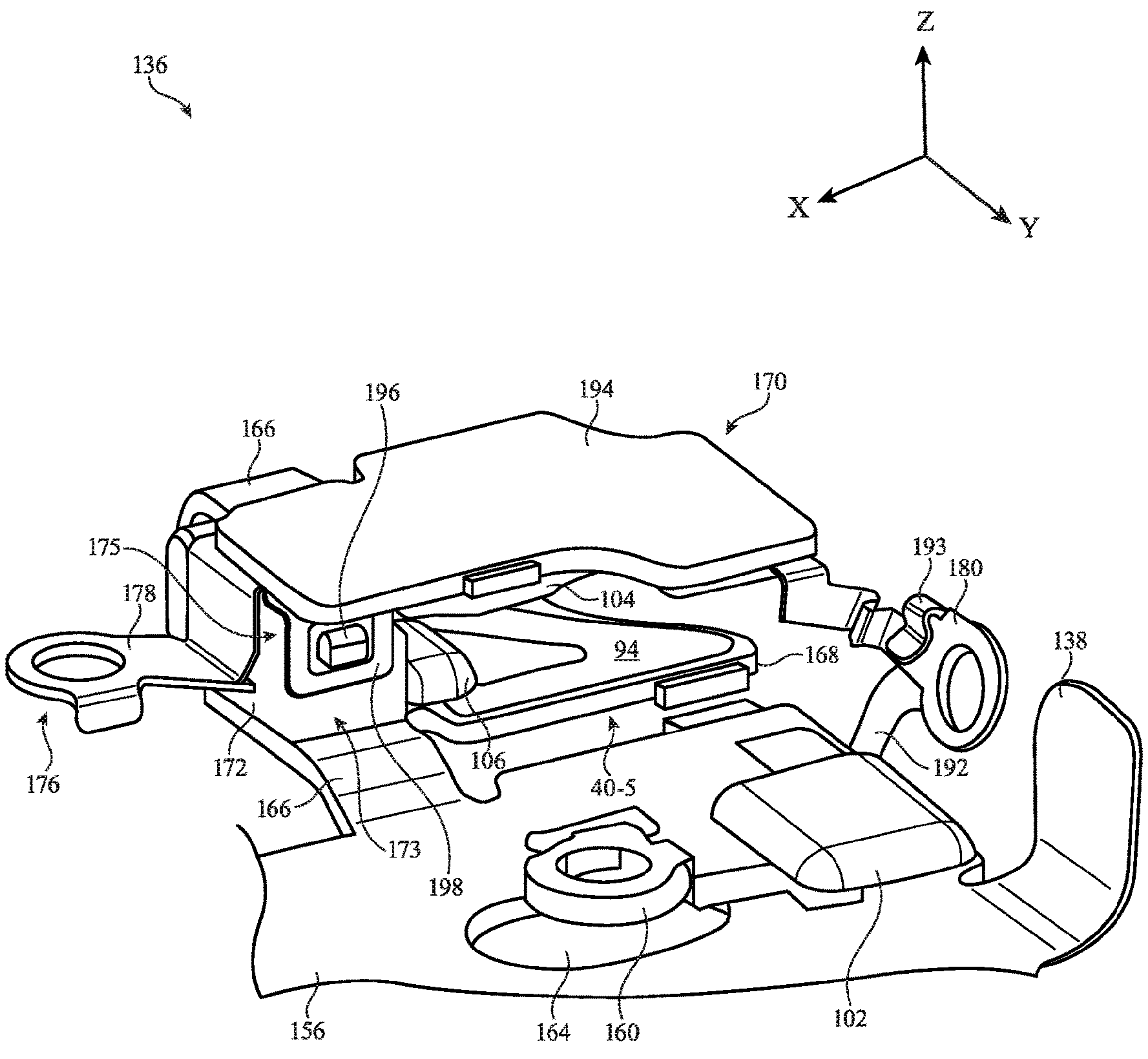
FIG. 12 is a perspective view showing how a portion of an illustrative flexible printed circuit may be folded around a plastic support block in accordance with some embodiments.

The example of FIGS. 10 and 11 is merely illustrative. In general, dock flex 136 may have any desired shape with any desired number of tails. Dock flex 136 may be formed from a single flexible printed circuit or from multiple flexible printed circuits that are surface-mounted together. FIG. 12 is a perspective view showing how second portion 170 of dock flex 136 may be secured to plastic support block 172 (e.g., in the folded configuration of FIG. 11).

As shown in FIG. 12, front end circuitry 102 for antenna 40-9 may be mounted to dock portion 156 of dock flex 136. Grounding clip 160 for antenna 40-9 may overlap opening 164 in dock portion 156 of dock flex 136. Feed clip 192 may also be mounted to dock portion 156 of dock flex 136. Tail

138 may be folded upwards and may extend away from dock portion 156 of dock flex 136.

Tail 166 may be wrapped around plastic support block 172 to hold second portion 170 of dock flex 136 over first portion 168 of dock flex 136. Conductive traces used to form antenna resonating element arm 94 may be printed onto first portion 168 of dock flex 136. An optional stiffener layer such as stiffener 194 may be layered onto second portion 170 of dock flex 136. When folded, front end circuitry 104 on second portion 170 may face front end circuitry 106 on first portion 168 of dock flex 136.

Grounding clip 178 may be coupled to the top surface of plastic support block 172. If desired, grounding clip 178 may be at least partially embedded (e.g., molded) within plastic support block 172. Grounding clip 176 may also be at least partially embedded within plastic support block 172. Grounding clip 178 may overlap and contact grounding clip 176. The same conductive screw or pin may extend through grounding clips 176 and 178 to couple the grounding clips to conductive support plate 58 (FIG. 8).

Plastic support block 172 may include an engagement structure such as snap hook clip 196. Snap hook clip 196 may, for example, be formed from an extension or tab of plastic support block 172. Grounding clip 178 may include engagement portion 198. Engagement portion 198 may include an opening. Snap hook clip 196 may protrude through the opening in engagement portion 198 of grounding clip 178. Snap hook clip 196 may hold (e.g., snap) engagement portion 198 onto plastic support block 172, thereby holding second portion 170 in place over first portion 168 of dock flex 136. This may, for example, ensure that the fold in tail 166 remains in place over time.

When second portion 170 of dock flex 136 is held in place by snap hook clip 196, bridging clip 180 may be placed into contact with feed clip 192. If desired, feed clip 192 may include an engagement structure such as tab 193. Tab 193 may hold (e.g., snap) bridging clip 180 in place on feed clip 192. The example of FIG. 12 in which tab 193 extends downwards from the top edge of feed clip 192 is merely illustrative. In another suitable arrangement, tab 193 may extend upwards from the bottom edge of feed clip 192. In this example, feed clip 192 may also include an opening that mates with an engagement feature on bridging clip 180, if desired.

Figure 13:
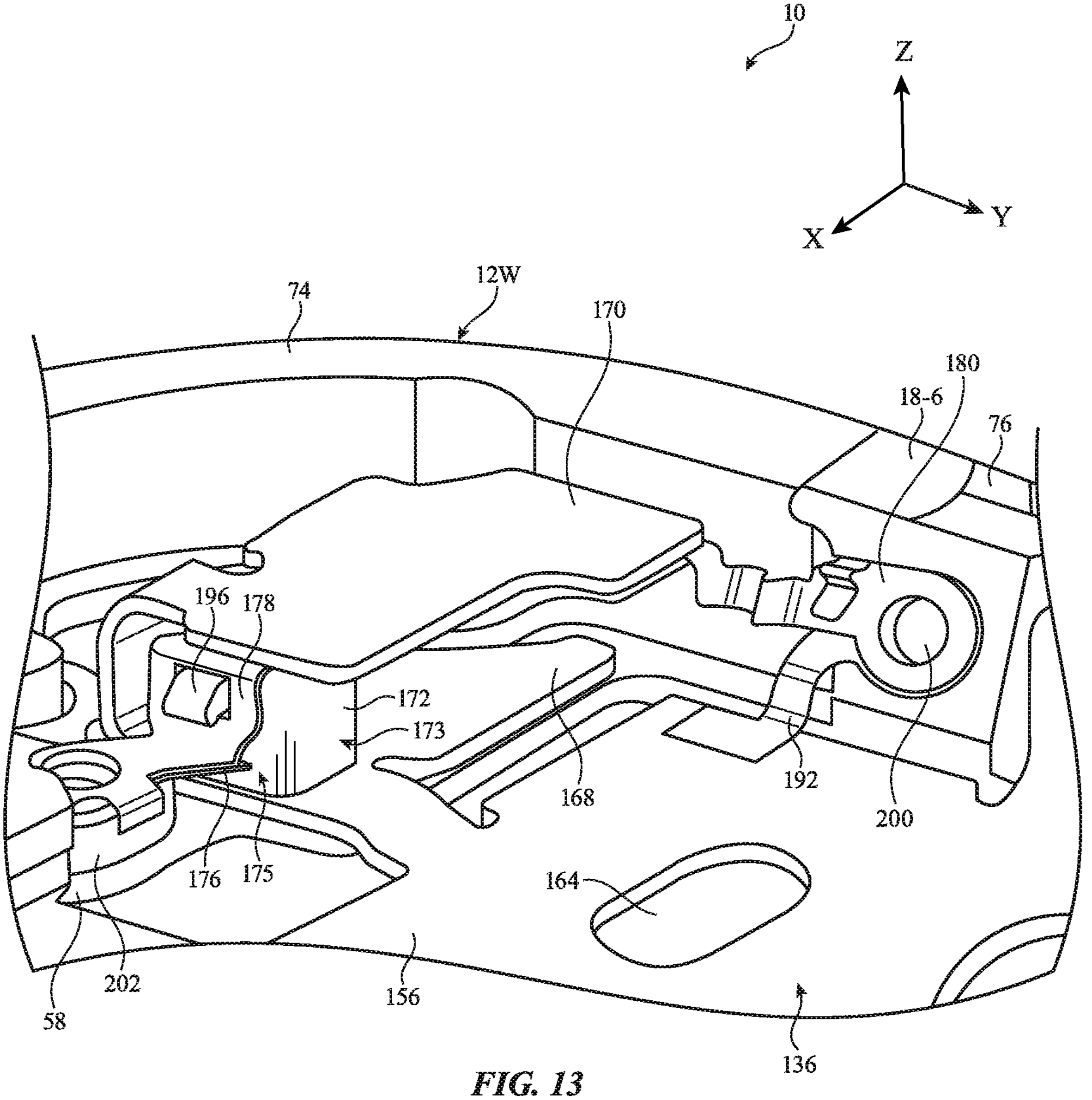
FIG. 13 is a perspective view showing how a portion of an illustrative flexible printed circuit may be folded around a plastic support block and integrated within a device in accordance with some embodiments.

In the example of FIG. 12, snap hook clip 196 is formed on northern face 173 of plastic support block 172 and grounding clips 178 and 176 extend from eastern face 175 of plastic support block 172. This is merely illustrative. In another suitable arrangement, snap hook clip 196 may be located on eastern face 175 of plastic support block 172. FIG. 13 is a perspective view showing how snap hook clip 196 may be located on eastern face 175 of plastic support block 172. FIG. 13 also shows one example of how dock flex 136 may be mounted to device 10. In the example of FIG. 13, grounding clip 160, front end circuitry 102, and antenna resonating element arm 94 are not shown for the sake of clarity.

As shown in FIG. 13, snap hook clip 196 may be formed on eastern face 175 of plastic support block 172. Grounding clips 178 and 176 may also extend from eastern face 175 of plastic support block 172. Grounding clip 178 may include an opening. Snap hook clip 196 may protrude through the opening to hold (snap) second portion 170 of dock flex 136 in place on plastic support block 172. Northern face 173 of plastic support block 172 may be free from conductive material in this example, if desired.

Dock flex 136 may be mounted to device 10. For example, segment 76 of peripheral conductive housing structures 12W may include an attachment structure such as threaded screw boss 200. Bridging clip 180 and feed clip 192 may be placed over and onto screw boss 200. A conductive screw (not shown) may be inserted into screw boss 200 through bridging clip 180 and feed clip 192. The conductive screw may help to mechanically secure dock flex 136 to peripheral conductive housing structures 12W and may form positive antenna feed terminal 52-9 of FIG. 8, for example.

While not shown in the perspective view of FIG. 13, feed clip 190 (FIGS. 10 and 11) may also couple second portion 170 of dock flex 136 to a screw boss on segment 74 of peripheral conductive housing structures 12W (e.g., for forming positive antenna feed terminal 52-3 of FIG. 8). As shown in FIG. 13, conductive support plate 58 may include an attachment structure such as threaded screw boss 202. Feed clips 176 and 178 may be placed over and onto screw boss 202. A conductive screw (not shown) may be inserted into screw boss 202 through grounding clips 178 and 176. The conductive screw may help to mechanically secure dock flex 136 to conductive support plate 58 and may form ground antenna feed terminal 44-5, terminal 128, ground antenna feed terminal 44-3, and/or terminal 118 of FIG. 8, for example.

Figure 14:
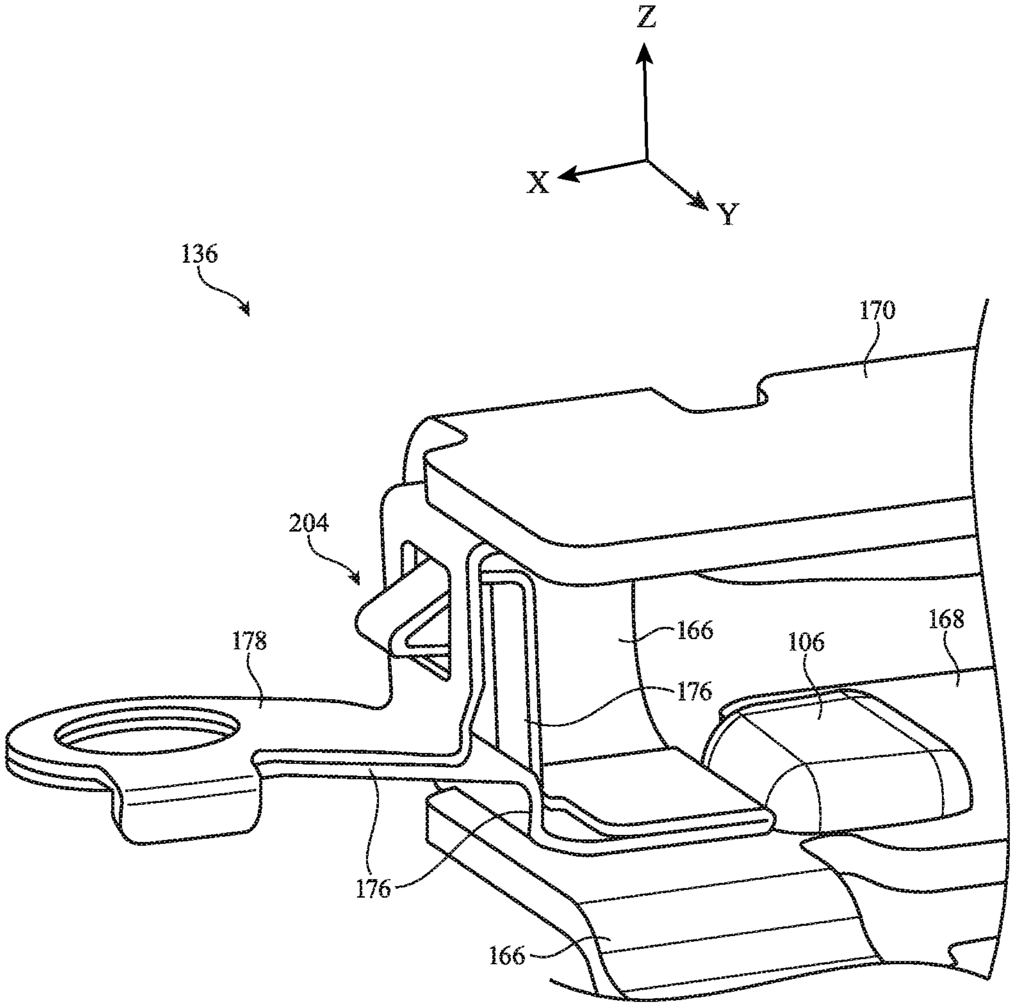
FIG. 14 is a perspective view of illustrative clip structures that may be used to couple a folded flexible printed circuit to an antenna ground in accordance with some embodiments.

The example of FIGS. 12 and 13 in which plastic support block 172 includes snap hook clip 196 is merely illustrative. In another suitable arrangement, engagement structures on grounding clips 178 and 176 may be used to hold folded tail 166 of dock flex 136 in place. FIG. 14 is a perspective view showing how grounding clips 178 and 176 may include engagement structures for holding folded tail 166 of dock flex 136 in place. In the example of FIG. 14, plastic support block 172 is not shown for the sake of clarity.

As shown in FIG. 14, grounding clip 176 may include an engagement structure such as engagement structure 204 (e.g., an extension or tab portion of grounding clip 176). Grounding clip 178 may include an opening. Engagement structure 204 may be inserted into the opening in grounding clip 178 to hold (snap) second portion 170 of dock flex 136 in place over first portion 168 of dock flex 136. The plastic support block may be molded (e.g., injection molded) over grounding clips 176 and 178 on tail 166 of dock flex 136. If desired, engagement structure 204 may protrude from the plastic support block after molding. Engagement structure 204 and grounding clips 176 and 178 may be located at the eastern face of the plastic support block (e.g., eastern face 175 of FIGS. 12 and 13).

Figure 15:
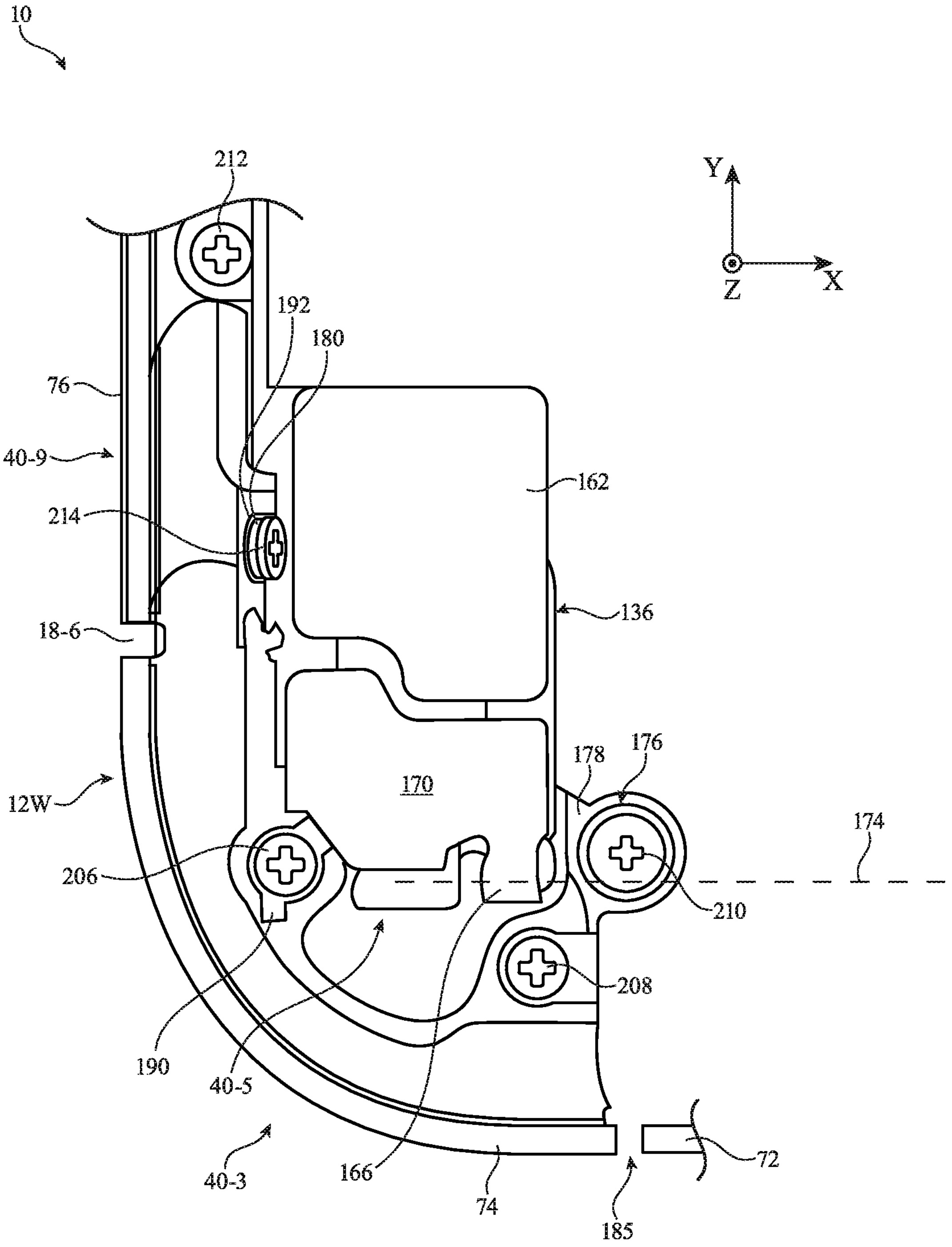
FIG. 15 is a top interior view showing how an illustrative flexible printed circuit may be screwed into a device in accordance with some embodiments.

FIG. 15 is a top interior view showing one example of how dock flex 136 may be screwed in place within device 10. As shown in FIG. 15, tail 166 of dock flex 136 may be wrapped or folded around axis 174 to hold second portion 170 of dock flex 136 in place over antenna 40-5. A conductive screw such as screw 210 may be inserted into grounding clips 176 and 178. Screw 210 may be screwed into screw boss 202 on conductive support plate 58 (FIG. 13) to help mechanically secure (affix) dock flex 136 to conductive support plate 58. At the same time, screw 210 may electrically short grounding clips 176 and 178 to conductive support plate 58.

A conductive screw such as screw 206 may be inserted into feed clip 190 for antenna 40-3. Screw 206 may be screwed into a screw boss on segment 74 of peripheral conductive housing structures 12W. Screw 206 may help to mechanically secure dock flex 136 to segment 74 of peripheral conductive housing structures 12W. At the same time, screw 206 may electrically couple the signal conductor for antenna 40-3 (e.g., signal conductor 46-3 of transmission line path 42-3 of FIG. 8) to positive antenna feed terminal 52-3 on segment 74 (FIG. 8).

A conductive screw such as screw 214 may be inserted into feed clip 192 for antenna 40-9 and bridging clip 180 for antenna 40-3. Screw 214 may be screwed into screw boss 200 on segment 76 of peripheral conductive housing structures 12W (FIG. 13). Screw 214 may help to mechanically secure dock flex 136 to segment 76 of peripheral conductive housing structures 12W. At the same time, screw 214 may electrically couple the signal conductor for antenna 40-9 (e.g., signal conductor 46-9 of transmission line path 42-9 of FIG. 8) to positive antenna feed terminal 52-9 on segment 76 (FIG. 8). Screw 214 may also electrically couple positive antenna feed terminal 52-3 to positive antenna feed terminal 52-9 (e.g., via bridging clip 180 and conductive path 108 of FIG. 8).

A conductive screw such as screw 212 may couple the ground conductor for antenna 40-9 (e.g., ground conductor 48-9 of transmission line path 42-9 of FIG. 8) to conductive support plate 58. A conductive screw such as screw 208 may couple antenna tuning component 120 of FIG. 8 to segment 74 of peripheral conductive housing structures 12W (e.g., at terminal 122). In another suitable arrangement, screw 208 may couple antenna tuning components 120 and 116 of FIG. 8 to conductive support plate 58 (e.g., at terminal 118). In this arrangement, screw 208 may be used to form terminal 118, whereas screw 210 is used to form terminal 128, ground antenna feed terminal 44-3, and/or ground antenna feed terminal 44-5 of FIG. 8, for example.

The example of FIG. 15 is merely illustrative. If desired, device 10 may include conductive springs at one or more of the locations of screws 212, 210, and 208. The conductive springs may couple these locations to conductive structures in display 14 of FIG. 1 (e.g., to extend the antenna ground at these locations to include conductive portions of display 14, thereby optimizing antenna performance). Screws 212, 214, 206, 210, and/or 208 of FIG. 15 may be replaced with any other desired conductive interconnect structures if desired (e.g., solder, welds, conductive springs, conductive pins, conductive foam, conductive gaskets, conductive brackets, conductive traces, sheet metal members, conductive screws, combinations of these, etc.).

In the example of FIG. 15, the curved tail 166 of dock flex 136 may be located adjacent (e.g., between or at least partially between) screws 210 and 208. This may serve to increase the antenna efficiency of antenna 40-3 relative to scenarios where the curved tail 166 of dock flex 136 is located between screws 206 and 208, for example. This example is merely illustrative and, in another suitable arrangement, the curved tail 166 of dock flex 136 may be located (e.g., interposed) between screws 206 and 208. In addition, folding dock flex 136 at tail 166 (e.g., from the southern direction) may, in general, serve to increase the overall antenna efficiency of antenna 40-5 by as much as 5-10 dB relative to scenarios where tail 166 is completely flat (e.g., as shown in FIG. 10). In this way, antennas 40-5, 40-3, and 40-9 may be configured to coexist within a very small volume at the bottom-left corner of device 10 while providing satisfactory radio-frequency performance in each of the frequency bands of operation of antennas 40-5, 40-3, and 40-9.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a housing having peripheral conductive structures;
a dielectric-filled gap in the peripheral conductive structures that divides the peripheral conductive structures into first and second segments;
an antenna ground;
a first slot that separates the antenna ground from the first segment;
a second slot that extends from an end of the first slot and beyond an edge of the dielectric-filled gap in the peripheral conductive structures, wherein the second slot has edges defined by the antenna ground and the second segment;
a first antenna feed having a first positive antenna feed terminal coupled to the first segment and a first ground antenna feed terminal coupled to the antenna ground;
a first radio-frequency transmission line coupled to the first antenna feed;
a second antenna feed having a second positive antenna feed terminal coupled to the second segment and a second ground antenna feed terminal coupled to the antenna ground;
a second radio-frequency transmission line coupled to the second antenna feed;
a conductive path that couples the first positive antenna feed terminal to the second positive antenna feed terminal; and
an additional conductive path that couples a node on the conductive path to the antenna ground.

2. The electronic device of claim 1, further comprising:
a return path coupled between the first segment and the antenna ground.

3. The electronic device of claim 2, further comprising:
a first antenna tuning component interposed on the return path; and
a second antenna tuning component interposed on the conductive path.

4. The electronic device of claim 1,
wherein the node is between an antenna tuning component on the conductive path and the first positive antenna feed terminal.

5. The electronic device of claim 4, further comprising:
an additional antenna tuning component interposed on the additional conductive path.

6. The electronic device of claim 5, wherein the first segment, the first antenna feed, and the first radio-frequency transmission line are configured to receive radio-frequency signals in an L5 Global Positioning System (GPS) frequency band, the second antenna feed, the second slot, and the second radio-frequency transmission line being configured to convey radio-frequency signals in a cellular ultra-high band.

7. The electronic device of claim 5, further comprising:
a flexible printed circuit that at least partially overlaps the first slot, wherein the flexible printed circuit comprises a tail, a first portion extending from a side of the tail, and a second portion at an end of the tail;
an antenna resonating element arm formed from conductive traces on the first portion of the flexible printed circuit;
a third antenna feed coupled between the antenna resonating element arm and the antenna ground; and
a third radio-frequency transmission line coupled to the third antenna feed.

8. The electronic device of claim 7, further comprising:

a plastic support block mounted to the tail of the flexible printed circuit, wherein the tail has a folded portion that is wrapped around the plastic support block, the plastic support block is interposed between the first and second portions of the flexible printed circuit, and the folded portion of the flexible printed circuit is laterally interposed between the plastic support block and the first segment.

9. The electronic device of claim 7, wherein the third antenna feed comprises a third ground antenna feed terminal, the electronic device further comprising:

a third antenna tuning component coupled between the antenna resonating element arm and the antenna ground;

a first conductive screw that couples the additional conductive path to the antenna ground at a first terminal; and a second conductive screw that couples the first ground antenna feed terminal, the third ground antenna feed terminal, and the third antenna tuning component to the antenna ground at a second terminal that is different from the first terminal.

10. The electronic device of claim 8, further comprising:

a first grounding clip mounted to the tail of the flexible printed circuit;

a second grounding clip mounted to the second portion of the flexible printed circuit; and a conductive screw that couples the first and second grounding clips to the antenna ground.

11. The electronic device of claim 8, further comprising:

a feed clip mounted to the flexible printed circuit, wherein the feed clip couples the second radio-frequency transmission line to the second positive antenna feed terminal;

a bridging clip mounted to the second portion of the flexible printed circuit, wherein the bridging clip forms a part of the conductive path; and a conductive screw that couples the feed clip and the bridging clip to the second segment at the second positive antenna feed terminal.

12. The electronic device of claim 10, wherein the plastic support block comprises a snap hook clip that holds the second portion of the flexible printed circuit in place over the first portion of the flexible printed circuit.

13. The electronic device of claim 10, wherein the first grounding clip comprises a tab, the second grounding clip comprises an opening, and the tab is inserted into the opening to hold the second portion of the flexible printed circuit in place over the first portion of the flexible printed circuit.

14. The electronic device of claim 1, further comprising:

a flexible printed circuit mounted to the peripheral conductive structures, wherein the flexible printed circuit comprises a first portion and a tail coupled between the first portion and a second portion of the flexible printed circuit;

first front end circuitry mounted to the first portion of the flexible printed circuit and coupled to the first radio-frequency transmission line; and second front end circuitry mounted to the second portion of the flexible printed circuit and coupled to the second radio-frequency transmission line.

15. The electronic device of claim 14, wherein the flexible printed circuit comprises a third portion that extends from a side of the tail, the electronic device further comprising:

an antenna resonating element arm on the third portion of the flexible printed circuit.

16. The electronic device of claim 15, further comprising:

a plastic support block on the tail, wherein the tail and the second portion of the flexible printed circuit are wrapped around the plastic support block, the second portion of the flexible printed circuit at least partially overlapping the third portion of the flexible printed circuit.

17. The electronic device of claim 16, wherein the plastic support block comprises a snap hook clip that is configured to hold the tail and the second portion of the flexible printed circuit in place.

18. The electronic device of claim 16, wherein the antenna ground comprises a conductive support plate, the electronic device further comprising:

a grounding clip at least partially embedded in the plastic support block; and a conductive screw that couples the grounding clip to the conductive support plate.

19. An electronic device comprising:

a housing having peripheral conductive structures;

a dielectric-filled gap in the peripheral conductive structures that divides the peripheral conductive structures into first and second segments;

an antenna ground;

a first slot that separates the antenna ground from the first segment;

a second slot that extends from an end of the first slot and beyond an edge of the dielectric-filled gap in the peripheral conductive structures, wherein the second slot has edges defined by the antenna ground and the second segment;

a first antenna feed having a first positive antenna feed terminal coupled to the first segment and a first ground antenna feed terminal coupled to the antenna ground;

a first radio-frequency transmission line coupled to the first antenna feed;

a second antenna feed having a second positive antenna feed terminal coupled to the second segment and a second ground antenna feed terminal coupled to the antenna ground;

a second radio-frequency transmission line coupled to the second antenna feed;

a flexible printed circuit;

an antenna on the flexible printed circuit;

first and second board-to-board connectors on the flexible printed circuit; and a dock port on the flexible printed circuit and coupled to the second board-to-board connector, wherein the first radio-frequency transmission line is on the flexible printed circuit and extends from the first board-to-board connector toward the first antenna feed, and the second radio-frequency transmission line is on the flexible printed circuit and extends from the first board-to-board connector toward the second antenna feed.

20. An electronic device comprising:

a housing having peripheral conductive structures;

a dielectric-filled gap in the peripheral conductive structures that divides the peripheral conductive structures into first and second segments;

an antenna ground;

a first slot that separates the antenna ground from the first segment;

a second slot that extends from an end of the first slot and beyond an edge of the dielectric-filled gap in the peripheral conductive structures, wherein the second slot has edges defined by the antenna ground and the second segment;

a first antenna feed having a first positive antenna feed terminal coupled to the first segment and a first ground antenna feed terminal coupled to the antenna ground;

a first radio-frequency transmission line coupled to the first antenna feed;

a second antenna feed having a second positive antenna feed terminal coupled to the second segment and a second ground antenna feed terminal coupled to the antenna ground;

a second radio-frequency transmission line coupled to the second antenna feed;

a flexible printed circuit mounted to the peripheral conductive structures;

first front end circuitry mounted to the flexible printed circuit and coupled to the first radio-frequency transmission line;

second front end circuitry mounted to the flexible printed circuit and coupled to the second radio-frequency transmission line; and an antenna resonating element arm on the flexible printed circuit.

* * * * *